US012596369B2

(12) United States Patent
Yoshimura et al.

(10) Patent No.: US 12,596,369 B2
(45) Date of Patent: Apr. 7, 2026

(54) CONTROL SYSTEM, MOBILE OBJECT, CONTROL METHOD, AND STORAGE MEDIUM

(71) Applicant: HONDA MOTOR CO., LTD., Tokyo (JP)

(72) Inventors: Misako Yoshimura, Wako (JP); Ichiro Baba, Wako (JP); Kosuke Nakanishi, Wako (JP); Yosuke Koike, Wako (JP); Koki Aizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 17/678,057

(22) Filed: Feb. 23, 2022

(65) Prior Publication Data

US 2022/0291684 A1 Sep. 15, 2022

(30) Foreign Application Priority Data

Mar. 11, 2021 (JP) ................................. 2021-039277

(51) Int. Cl.
*G05D 1/00* (2024.01)
*G01C 21/34* (2006.01)
(Continued)

(52) U.S. Cl.
CPC ....... *G05D 1/0088* (2013.01); *G01C 21/3461* (2013.01); *G05D 1/0212* (2013.01); *G08G 1/052* (2013.01); *G08G 1/056* (2013.01)

(58) Field of Classification Search
CPC .... G01C 21/3461; G08G 1/052; G08G 1/056; G05D 1/0088; G05D 1/0212
See application file for complete search history.

(56) References Cited

U.S. PATENT DOCUMENTS 11,486,717 B1 * 11/2022 Kobitzsch .......... G01C 21/3632
2010/0036599 A1 * 2/2010 Froeberg ............ G01C 21/3461
701/532

(Continued)

FOREIGN PATENT DOCUMENTS

CN 110053619 7/2019
CN 110271544 9/2019
(Continued)

OTHER PUBLICATIONS

Japanese Office Action for Japanese Patent Application No. 2021-039277 mailed Nov. 29, 2022.

(Continued)

*Primary Examiner* — Hunter B Lonsberry
*Assistant Examiner* — Harrison Heflin
(74) *Attorney, Agent, or Firm* — Amin, Turocy & Watson, LLP

(57) ABSTRACT

A control system of a mobile object that can move in any one operation mode determined from a plurality of operation modes is provided. The control system includes: a storage device configured to store instructions; and one or more processors, wherein the one or more processors execute the instructions stored in the storage device to: determine whether a predetermined road is a first road in which passage of vehicles in a mode other than a first operation mode in which a maximum moving speed of the mobile object is less than a predetermined speed is restricted; and execute a first process of generating a route of the mobile object so as to include the road determined to be first road and a second process of generating a route of the mobile object so as not to include the road determined to be the first road.

16 Claims, 15 Drawing Sheets

1M1

| ROUTE A | ESTIMATED TIME OF ARRIVAL:12:00 | TIME-EMPHASIS ROUTE TRAVEL ON ROADWAYS AND SIDEWALKS |
|---------|--------------------------------|------------------------------------------------------|
| ROUTE B | ESTIMATED TIME OF ARRIVAL:12:15 | BALANCED ROUTE TRAVEL ON MANY SIDEWALKS |
| ROUTE C | ESTIMATED TIME OF ARRIVAL:12:30 | COMFORT ROUTE TRAVEL ON SIDEWALKS |

PEDESTRIAN ROUTE (TRAVEL IN WALKING MODE)

VEHICLE ROUTE (TRAVEL IN VEHICLE MODE)

(51) Int. Cl.
    *G08G 1/052*         (2006.01)
    *G08G 1/056*         (2006.01)

(56)           References Cited

U.S. PATENT DOCUMENTS

| | | | |
|---|---|---|---|
| 2011/0160996 A1* | 6/2011 | Terai | G01C 22/002 |
| | | | 701/532 |
| 2014/0136414 A1* | 5/2014 | Abhyanker | G06Q 20/3224 |
| | | | 701/25 |
| 2016/0214675 A1* | 7/2016 | DeCordova | B62M 6/65 |
| 2018/0203455 A1* | 7/2018 | Cronin | B60W 60/0011 |
| 2019/0156599 A1* | 5/2019 | Jammoussi | B60W 30/146 |
| 2019/0220030 A1 | 7/2019 | Ohmura | |
| 2019/0383627 A1* | 12/2019 | Nangeroni | B60W 50/0098 |
| 2020/0391747 A1 | 12/2020 | Ohmura et al. | |
| 2020/0398923 A1* | 12/2020 | Griffith | B60L 50/60 |
| 2021/0034156 A1* | 2/2021 | Drayna | G06F 3/017 |
| 2021/0310820 A1* | 10/2021 | Park | G01C 21/3415 |
| 2022/0212693 A1* | 7/2022 | Fang | B60W 60/0011 |
| 2022/0274624 A1* | 9/2022 | Wray | G01C 21/3837 |

FOREIGN PATENT DOCUMENTS

| | | |
|---|---|---|
| CN | 111741881 | 10/2020 |
| JP | 2009-204590 | 9/2009 |
| JP | 2021-015008 | 2/2021 |

OTHER PUBLICATIONS

Chinese Office Action for Chinese Patent Application No. 202210159235.X mailed Apr. 10, 2025.

* cited by examiner

Figure 4:
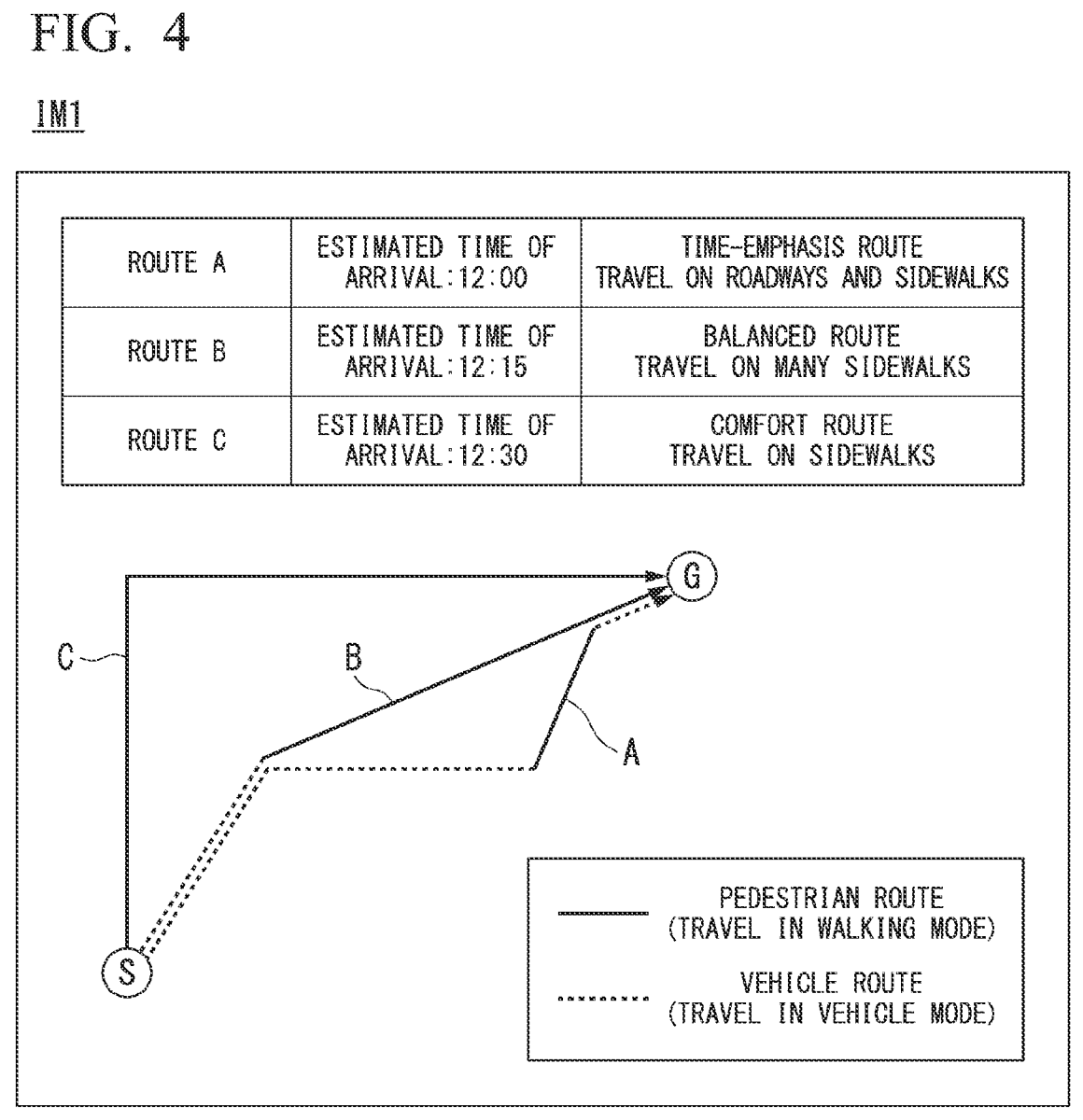

| ROUTE A | ESTIMATED TIME OF ARRIVAL:12:00 | TIME-EMPHASIS ROUTE TRAVEL ON ROADWAYS AND SIDEWALKS |
|---------|--------------------------------|------------------------------------------------------|
| ROUTE B | ESTIMATED TIME OF ARRIVAL:12:15 | BALANCED ROUTE TRAVEL ON MANY SIDEWALKS |
| ROUTE C | ESTIMATED TIME OF ARRIVAL:12:30 | COMFORT ROUTE TRAVEL ON SIDEWALKS |

———————  PEDESTRIAN ROUTE
(TRAVEL IN WALKING MODE)

··········  VEHICLE ROUTE
(TRAVEL IN VEHICLE MODE)

Figure 5:
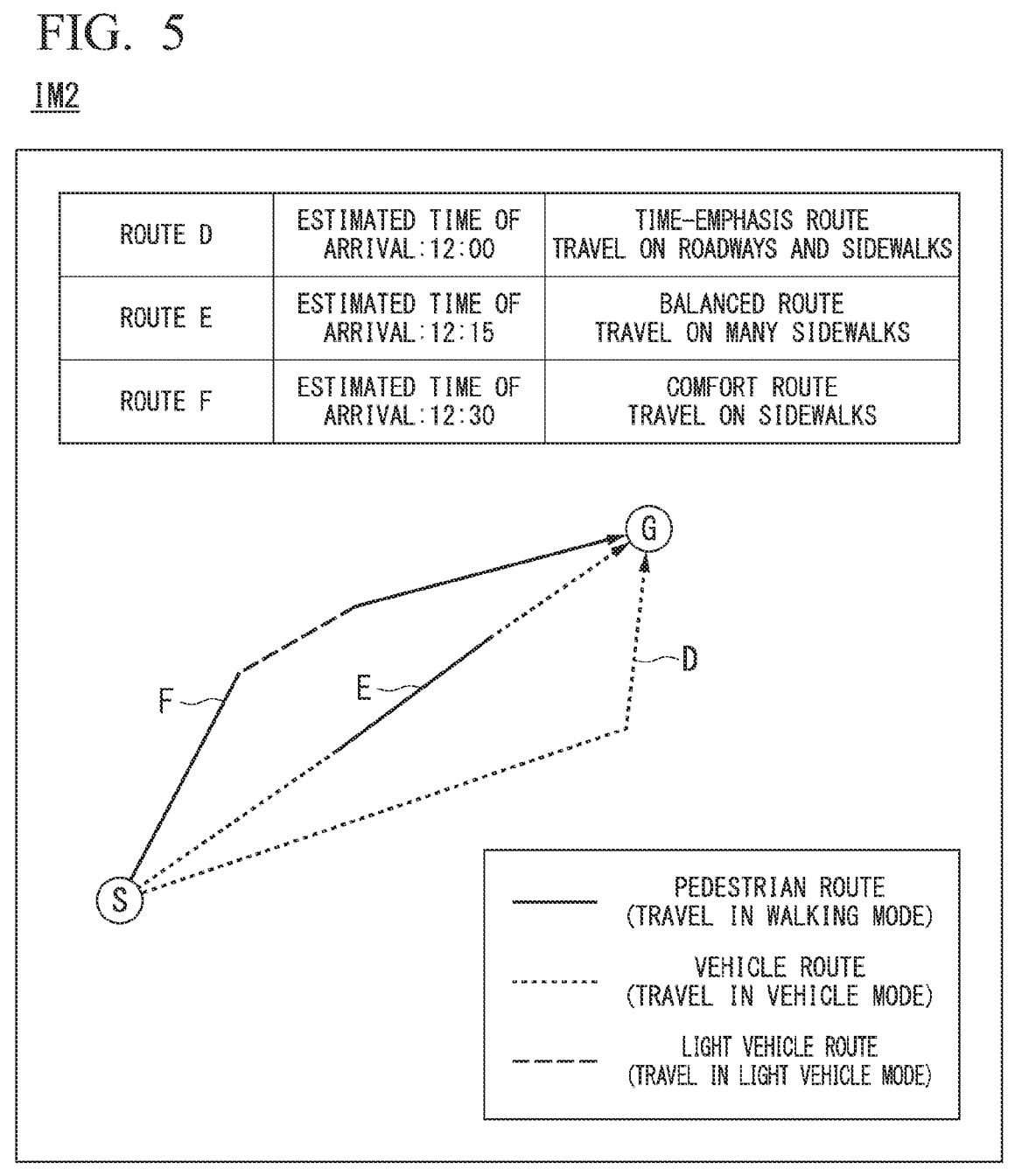

| ROUTE D | ESTIMATED TIME OF ARRIVAL:12:00 | TIME-EMPHASIS ROUTE TRAVEL ON ROADWAYS AND SIDEWALKS |
|---------|---------------------------------|-----------------------------------------------------|
| ROUTE E | ESTIMATED TIME OF ARRIVAL:12:15 | BALANCED ROUTE TRAVEL ON MANY SIDEWALKS |
| ROUTE F | ESTIMATED TIME OF ARRIVAL:12:30 | COMFORT ROUTE TRAVEL ON SIDEWALKS |

G

D

F

E

S

——————— PEDESTRIAN ROUTE
(TRAVEL IN WALKING MODE)

··········· VEHICLE ROUTE
(TRAVEL IN VEHICLE MODE)

— — — LIGHT VEHICLE ROUTE
(TRAVEL IN LIGHT VEHICLE MODE)

Pa

SECOND
DIRECTION

FIRST
DIRECTION

IM3

| ROUTE G | ESTIMATED TIME OF ARRIVAL:12:00 | TRAVEL ON MANY SIDEWALKS |
|---------|--------------------------------|--------------------------|
| ROUTE H | ESTIMATED TIME OF ARRIVAL:12:10 | TRAVEL ON ROADWAYS |

————— PEDESTRIAN ROUTE
(TRAVEL IN WALKING MODE)

·········· VEHICLE ROUTE
(TRAVEL IN VEHICLE MODE)

ACCEPTANCE LEVEL: ○ > △ > ×

| ITEM / MODE | STEP | TRAVEL ON BOUNDARY BETWEEN SIDEWALK AND ROADWAY | HILL | CURVED ROAD | CONGESTION (PEOPLE, CAR) | SLOPE | MANY SIGNALS |
|---|---|---|---|---|---|---|---|
| TIME-EMPHASIS MODE | ○ | ○ | ○ | ○ | × | ○ | × |
| BALANCED MODE | △ | △ | △ | △ | △ | △ | △ |
| COMFORT MODE | × | × | × | × | ○ | × | ○ |

START

S200
DERIVE PLURALITY OF ROUTES
BY REFERRING TO MAP INFORMATION

S202
DERIVE SCORE CORRESPONDING TO
TRAVEL MODE SET FOR
EACH OF PLURALITY OF ROUTES

S204
SELECT ROUTE WITH HIGH SCORE

END

FIG. 15

| | NUMBER OF STEPS (×1) | NUMBER OF SWITCHINGS BETWEEN SIDEWALK AND ROADWAY (×1) | ... | DEGREE OF CONGESTION (PEOPLE, CAR) (×0.2) | ... | SCORE |
|---|---|---|---|---|---|---|
| ROUTE 1 | 1 | 1 | ... | 8 | ... | ○○ |
| ROUTE 2 | 5 | 5 | ... | 6 | ... | ×× |
| ROUTE 3 | 10 | 10 | ... | 2 | ... | △△ |

Figure 16:
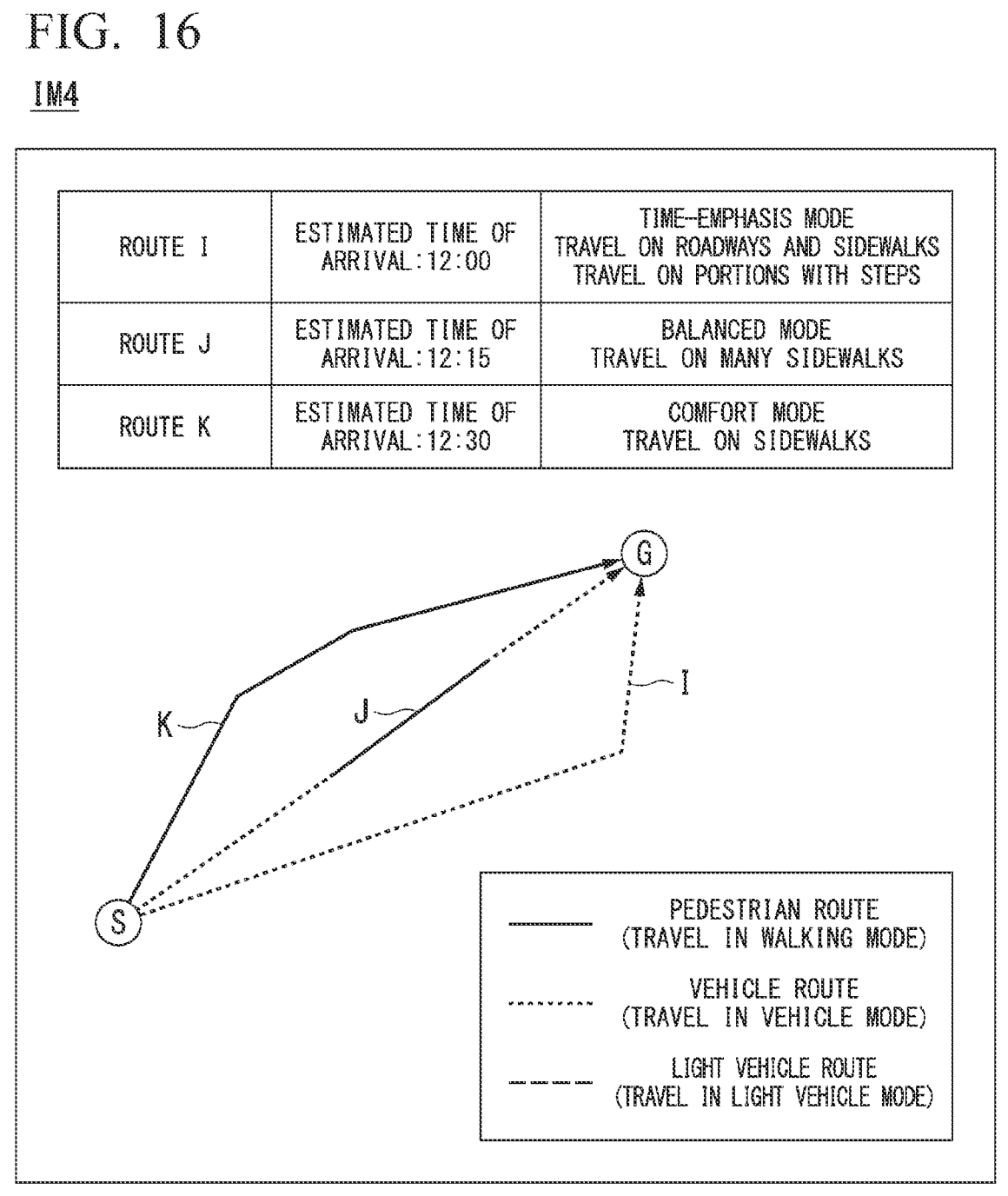

| ROUTE I | ESTIMATED TIME OF ARRIVAL:12:00 | TIME-EMPHASIS MODE TRAVEL ON ROADWAYS AND SIDEWALKS TRAVEL ON PORTIONS WITH STEPS |
| ROUTE J | ESTIMATED TIME OF ARRIVAL:12:15 | BALANCED MODE TRAVEL ON MANY SIDEWALKS |
| ROUTE K | ESTIMATED TIME OF ARRIVAL:12:30 | COMFORT MODE TRAVEL ON SIDEWALKS |

———— PEDESTRIAN ROUTE
(TRAVEL IN WALKING MODE)

·········· VEHICLE ROUTE
(TRAVEL IN VEHICLE MODE)

— — — LIGHT VEHICLE ROUTE
(TRAVEL IN LIGHT VEHICLE MODE)

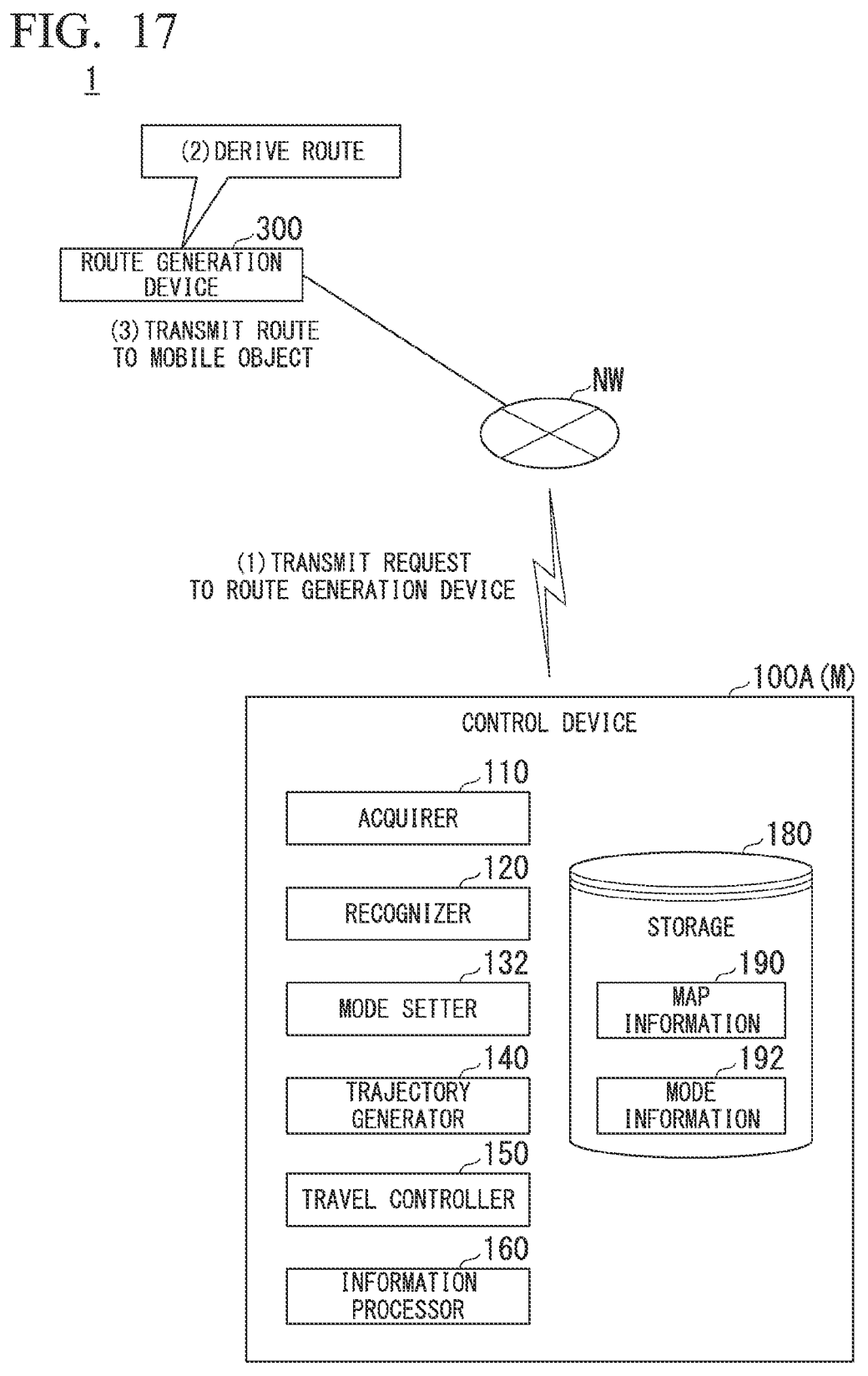

FIG. 17
1

(2) DERIVE ROUTE

ROUTE GENERATION
DEVICE          300

(3) TRANSMIT ROUTE
TO MOBILE OBJECT

NW (1) TRANSMIT REQUEST
TO ROUTE GENERATION DEVICE 100A (M)

CONTROL DEVICE

ACQUIRER          110

RECOGNIZER          120

MODE SETTER          132

TRAJECTORY
GENERATOR          140

TRAVEL CONTROLLER          150

INFORMATION
PROCESSOR          160

STORAGE          180

MAP
INFORMATION          190

MODE
INFORMATION          192

CONTROL SYSTEM, MOBILE OBJECT, CONTROL METHOD, AND STORAGE MEDIUM

CROSS-REFERENCE TO RELATED APPLICATION

This application claims priority to and the benefit from Japanese Patent Application No. 2021-039277, filed on Mar. 11, 2021, the contents of which are hereby incorporated by reference into the present application.

FIELD

The present invention relates to control systems, mobile objects, control method, and storage media.

DESCRIPTION OF RELATED ART

Previously, a navigation device mounted on or brought into a vehicle has been disclosed (Japanese Unexamined Patent Application, First Publication No. 2021-015008). This navigation device includes a determination means for determining whether the vehicle is traveling on a predetermined type of road or in a predetermined place based on the current position of the vehicle, a drawing means for drawing a map that does not include a predetermined display component when it is determined that the vehicle is traveling on the predetermined type of road or in the predetermined place, and a display means for displaying the map.

SUMMARY

However, with the above-described techniques, a suitable route may not be generated.

With the foregoing in view, one of the objects of the present invention is to provide a control system, a mobile object, a control method, and a storage medium capable of generating a more suitable route.

The control system, mobile object, control method, and storage medium according to the present invention have the following configurations.

(1) A control system according to an aspect of the present invention is a control system of a mobile object that can move in any one operation mode determined from a plurality of operation modes, the control system including: a storage device configured to store instructions; and one or more processors, wherein the one or more processors execute the instructions stored in the storage device to: determine whether a predetermined road is a first road in which passage of vehicles in an operation mode other than a first operation mode in which a maximum moving speed of the mobile object is less than a predetermined speed is restricted; and execute a first process of generating a route of the mobile object so as to include the road determined to be first road and a second process of generating a route of the mobile object so as not to include the road determined to be the first road.

(2) A control system according to another aspect of the present invention is a control system of a mobile object that can move in any one operation mode determined from a plurality of operation modes, the control system including: a storage device configured to store instructions; and one or more processors, wherein the one or more processors execute the instructions stored in the storage device to: determine whether a predetermined road is a first road in which passage of a predetermined type of vehicle is restricted and passage of pedestrians is permitted; and execute a first process of generating a route of the mobile object so as to include the road determined to be the first road and a second process of generating a route of the mobile object so as not to include the road determined to be the first road.

(3) In aspect (2) or (3), the one or more processors execute the instructions to: determine that the predetermined road is the first road when the predetermined road is a sidewalk.

(4) In any one of aspects (1) to (3), the one or more processors execute the instructions to: determine that the predetermined road is the first road when the predetermined road is a direction-regulated road in which a traffic regulation allows a predetermined type of vehicle to travel in a first direction and restricts the predetermined type of vehicle from traveling in a second direction opposite to the first direction.

(5) In aspect (4), the one or more processors execute the instructions to: generate a route in which vehicles travel on the direction-regulated road in the second direction by the first process.

(6) In any one of aspects (1) to (5), the one or more processors execute the instructions to: generate a route of the mobile object to a predetermined point as a route including a first route generated by the first process and a second route generated by the second process.

(7) In any one of aspects (1) to (6), the one or more processors execute the instructions to: execute the first process based on acquisition of information on a user's determination to permit operation in the first operation mode.

(8) In any one of aspects (1) to (7), the one or more processors execute the instructions to: execute the first process based on acquisition of information on a user's determination to move using the first operation mode.

(9) In any one of aspects (1) to (8), the one or more processors execute the instructions to: execute the first process based on acquisition of information on a user's determination to execute the first process.

(10) In any one of aspects (1) to (9), the one or more processors execute the instructions to: cause an output device to output information of a portion determined to be the first road in a first route generated by the first process so as to be distinguished from information of other portions.

(11) In any one of aspects (1) to (10), the one or more processors execute the instructions to: cause an output device to output information indicating that a moving speed decreases in a portion determined to be the first road in a first route generated by the first process.

(12) In aspect (11), the output device outputs that the moving speed decreases when the mobile object enters the road determined to be the first road.

(13) A mobile object equipped with the control system according to any one of aspects (1) to (11).

(14) A control method according to an aspect of the present invention is a control method for controlling a mobile object that can move in any one operation mode determined from a plurality of operation modes, the method causing a computer to execute: determining whether a predetermined road is a first road in which passage of vehicles in a mode other than a first operation mode in which a maximum moving speed of the mobile object is less than a predetermined speed is restricted; and executing a first process of generating a route of the mobile object so as to include the road determined to be first road and a second process of generating a route of the mobile object so as not to include the road determined to be the first road.

(15) Instructions stored in a non-transitory computer storage medium according to an aspect of the present invention is instructions for controlling a mobile object that can move in any one operation mode determined from a plurality of operation modes, the instructions causing a computer to execute: determining whether a predetermined road is a first road in which passage of vehicles in a mode other than a first operation mode in which a maximum moving speed of the mobile object is less than a predetermined speed is restricted; and executing a first process of generating a route of the mobile object so as to include the road determined to be first road and a second process of generating a route of the mobile object so as not to include the road determined to be the first road.

According to aspects (1) to (15), the control system can generate a more suitable route. For example, the control system can generate a route including a road determined to be the first road.

According to aspect (4), since the control system can include a road in which a predetermined type of vehicle cannot enter in the route, the range of choice of routes can be further expanded, and the mobile object travels along a route in which a predetermined type of vehicle does not travel. Therefore, the users comfort is improved.

According to any one of aspects (7) to (9), the control system executes the first process according to the user's intention. As a result, a route corresponding to the user's intention is generated, the satisfaction level and convenience of the user, and the like are improved.

According to aspect (10) or (11), the control system provides the user with information about the portion determined to be the first road, so that the user can easily recognize the characteristics of the generated route. As a result, the user can easily select a route that meets the user's preference, and the user feels more convinced of the selected route.

According to aspect (12), the control system notifies the user that the traveling state of the mobile object changes depending on the characteristics of the route, so that the user can recognize the change in advance. As a result, the feeling of security and conviction of the user are improved.

BRIEF DESCRIPTION OF THE DRAWINGS

FIG. 4 is a diagram (1) showing an example of an image displayed on a display.

FIG. 5 is a diagram (2) showing an example of an image displayed on the display.

FIG. 12 is a diagram showing an example of mode information 192 in which a travel mode and an acceptance level for each of a plurality of events are associated with each other.

FIG. 15 is a diagram showing an example of scores for each of a plurality of routes.

FIG. 16 is a diagram showing an example of an image IM4 including a route generated by a control device.

FIG. 17 is a diagram showing an example of a functional configuration of a route search system including a mobile object according to a third embodiment.

DETAILED DESCRIPTION

Hereinafter, a control system, a mobile object, a control method, and a storage medium according to the embodiment of the present invention will be described with reference to the drawings. As used throughout this disclosure, the singular forms "a," "an," and "the" include plural reference unless the context clearly dictates otherwise.

First Embodiment

[Overall Configuration]

Figure 1:
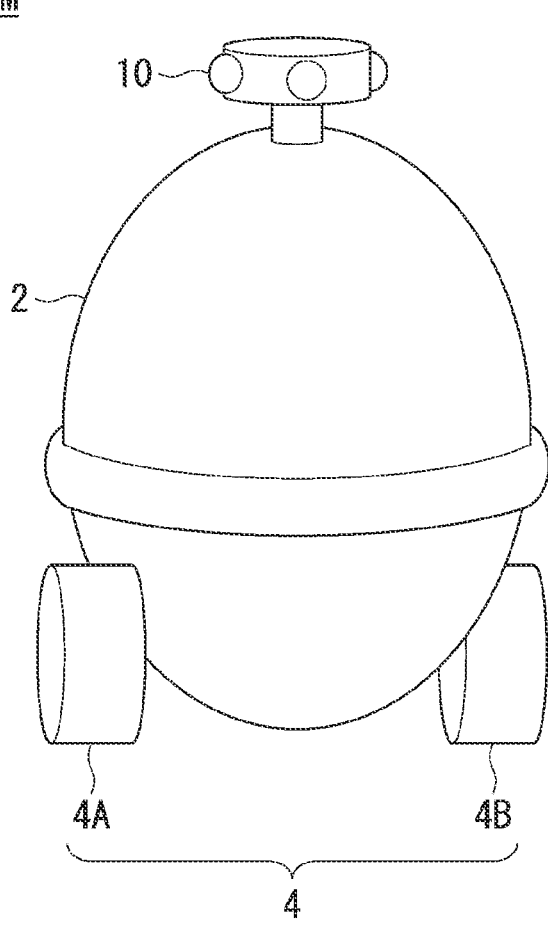
FIG. 1 is a diagram showing an example of a mobile object including a control device according to an embodiment.

FIG. 1 is a diagram showing an example of a mobile object M including a control device according to an embodiment. The mobile object M is an autonomous mobile robot. The mobile object M supports the user's behavior. For example, the mobile object M stops at a position designated by the user, carries the user, and transports the user to the destination. In the present embodiment, the mobile object M is described as moving while carrying the user aboard. However, instead of this (or in addition to this), the mobile object M may transport an article or lead the user to move together with the user and may follow the user to support the user's behavior. The mobile object M may not be able to carry the user aboard. In the following description, while the mobile object M is described as traveling, when the mobile object M does not travel but moves by walking or in other modes, the following words "traveling" and "travel mode" may be read "moving" and "moving mode".

The mobile object M includes a main body 2, one or more wheels 4 (4A and 4B in the figure), and a camera 10. The main body 2 is provided with an entrance and exit such as a door (not shown) that allows the user to enter and exit the main body 2, and the user can enter the main body 2 from the entrance and exit and board the mobile object M. For example, the mobile object M drives the wheel 4 based on the image captured by the camera 10 to transport the user.

In the present embodiment, the user is described as boarding in the main body 2. However, instead of this (or in addition to this), the mobile object M may be provided with a seating portion on which the user can be seated without boarding in the main body 2 to move together with the mobile object M, a step on which the user puts his/her foot for movement, and the like. For example, the moving object may be scooter.

Figure 2:
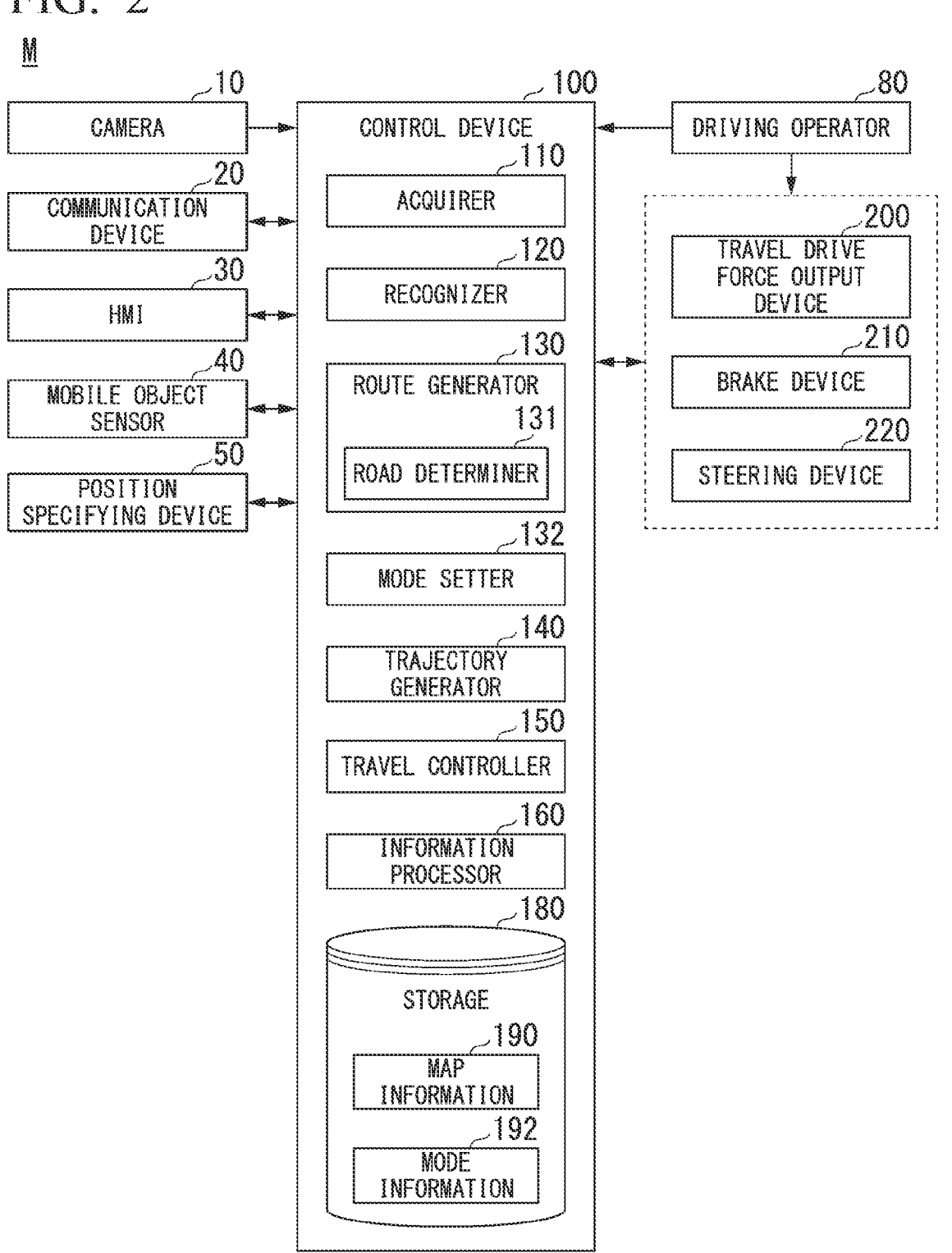
FIG. 2 is a diagram showing an example of another functional configuration included in a mobile object.

FIG. 2 is a diagram showing an example of another functional configuration included in the mobile object M. The mobile object M includes, for example, a camera 10, a communication device 20, an HMI 30, a mobile object sensor 40, a position specifying device 50, a driving operator 80, a control device 100, a travel drive force output device 200, a brake device 210, and a steering device 220.

The camera 10 captures the images around the mobile object M. The camera 10 is, for example, a fisheye camera capable of capturing the images around the mobile object M at a wide angle (for example, at 360 degrees). The camera 10 is attached to the upper part of the mobile object M, for example, and captures the images around the mobile object M at a wide angle in the horizontal direction. The camera 10 may be realized by combining a plurality of cameras (a plurality of cameras that capture a range of 120 degrees or a range of 60 degrees with respect to the horizontal direction). In addition to the camera 10, the mobile object M may include a radar device or LIDAR that detects an object.

The communication device 20 is a communication interface for communicating with other devices using a cellular network, a Wi-Fi network, Bluetooth (registered trademark), a dedicated short range communication (DSRC), or the like.

The HMI 30 presents various pieces of information to the user of the mobile object M and receives input operations of the user. The HMI 30 includes various display devices, speakers, buzzers, touch panels, switches, keys, and the like.

The mobile object sensor 40 includes a vehicle speed sensor that detects the speed of the mobile object M, an acceleration sensor that detects vertical and lateral accelerations of the mobile object M, a yaw rate sensor that detects the angular speed around the vertical axis, and an azimuth sensor that detects the direction of the mobile object M, and the like.

The position specifying device 50 specifies the position of the mobile object M based on the signal received from a GNSS satellite. The position of the mobile object M may be specified or complemented by an inertial navigation system (INS) using the output of the mobile object sensor 40.

The driving operator 80 includes, for example, an acceleration pedal, a brake pedal, a shift lever, a deformed steering wheel, a joystick, and other operators. Sensors that detect an amount of operation or the presence of an operation are attached to the driving operator 80, and the detection results are output to the control device 100, or any one or all of the travel drive force output device 200, the brake device 210, and the steering device 220. If the mobile object M is controlled only by automated driving, the driving operator 80 may be omitted.

The control device 100 includes, for example, an acquirer 110, a recognizer 120, a route generator 130, a mode setter 132, a trajectory generator 140, a travel controller 150, an information processor 160, and a storage 180. The acquirer 110, the recognizer 120, the route generator 130, the mode setter 132, the trajectory generator 140, the travel controller 150, and the information processor 160 each are realized when a hardware processor such as a central processing unit (CPU) or the like executes a program (software). Some or all of these components may be realized by hardware (a circuit portion; including circuitry) such as large-scale integration (LSI), an application specific integrated circuit (ASIC), a field-programmable gate array (FPGA), or a graphics processing unit (GPU) and may be realized by the cooperation of software and hardware. The program may be stored in advance in the storage 180 (a storage device including a non-transitory storage medium) such as a HDD or a flash memory and may be stored in a removable storage medium such as a DVD or a CD-ROM and be installed in a HDD or a flash memory when a storage medium (a non-transitory storage medium) is attached to a drive device. Some of the above-mentioned functional units may be included in other devices. The information processor 160 is an example of an "output device". Some of the above-described functional units may be mounted on a device different from the control device 100. A configuration including the acquirer 110 and the route generator 130, or the route generator 130 is an example of a "control system".

The acquirer 110 acquires an image captured by the camera 10. The acquirer 110 acquires an image of the road surface around the mobile object M. The acquirer 110 acquires a request requesting a route search.

The recognizer 120 recognizes an object or a situation around the mobile object M using, for example, the functions of artificial intelligence (AI) or the functions of a predetermined model, or using them in parallel. For example, the function of "recognizing the area where the mobile object M can travel" may be realized by executing recognition of roads, sidewalks, curbs, and the like by deep learning and recognition based on a predetermined condition (signals which can be subjected to pattern matching) in parallel and scoring both recognition results to make comprehensive evaluation. The recognizer 120 may execute a semantic segmentation process to classify pixels in the frame of an image into classes (for example, an object, a travelable area, a non-travelable area, and the like) and recognize an area in which the mobile object M can travel based on the classification result. As a result, the reliability of the movement of the mobile object M is guaranteed.

The recognizer 120 recognizes the state such as a position, a speed, an acceleration, and the like of an object around the mobile object M based on the image captured by the camera 10. The position of an object is recognized as the position on an absolute coordinate system in which a representative point (the center of gravity, the center of a driving shaft, or the like) of the mobile object M is at the origin, for example, and is used for control. The position of an object may be represented by a representative point such as the center of gravity or a corner of the object and may be represented by an area. The "state" of an object may include the acceleration or a jerk of an object or a "behavior state" (for example, whether the object has changed or is trying to change lanes). The recognizer 120 recognizes, for example, lane marks, road shoulders, curbs, a median strip, guard rails, a temporary stop line, an obstacle, a sign, and other road events. The recognizer 120 recognizes the position and posture of the mobile object M. The recognizer 120 may derive the degree of congestion in a predetermined area using the position of the object obtained from the image. The predetermined area is, for example, an area in which the mobile object M is going to travel. The degree of congestion is the density and number of objects on the road surface. The degree of congestion may be obtained from another device. In this case, the communication device 20 acquires information indicating the degree of congestion from other devices.

The route generator 130 includes, for example, a road determiner 131. The road determiner 131 determines the type of road. The road determiner 131 determines the type of road with reference to the map information 190. The road determiner 131 determines, for example, whether a predetermined road is a first road in which the passage of vehicles in a mode other than an operation mode in which the maximum moving speed of the mobile object M is less than a predetermined speed (for example, the maximum moving speed is about the walking speed) is restricted. The "predetermined road" may be an outdoor road or an indoor road. The "predetermined road" may be, for example, a road or a passage in a facility such as an airport. The above-mentioned "first road" may be, for example, a road in which the passage of a predetermined type of vehicle is restricted and the passage of pedestrians is permitted. The "predetermined type of vehicle" is, for example, a vehicle such as a bicycle or a motorcycle. The predetermined type of vehicle may include bicycles. The above-described "first road" may be, for example, a sidewalk.

The map information 190 is associated with, for example, information indicating whether a target predetermined road is a first road or another road. Hereinafter, the first road will be described as being a sidewalk. The map information 190 stores, for example, the type of each road and information indicating whether the road is a sidewalk, a roadway, or a road for a light vehicle. The road determiner 131 may acquire the road type from another device instead of (or in addition to) the map information 190.

The route generator 130 can execute, for example, a first process of generating a moving route of the mobile object M so as to include a road determined to be the first road by the road determiner 131 and a second process of generating a moving route of the mobile object M so as not to include a route determined to be the first road. The route generator 130 generates, for example, a route to a predetermined point of the mobile object M as a route including a first route generated by the first process and a second route generated by the second process.

The route generator 130 searches for a route along which the mobile object M heads for the destination, for example, based on a request for searching for the route. The mobile object M can travel along a pedestrian route in which passage of vehicles and light vehicles (hereinafter referred to as a "group of vehicles") is not permitted and passage of pedestrians is permitted, a vehicle route in which passage of a group of vehicles is permitted and passage of pedestrians is not permitted, and a light vehicle route in which passage of light vehicles and pedestrians is permitted and passage of vehicles is not permitted. The route generator 130 searches for a route including one or more of, for example, a pedestrian route, a vehicle route, or a light vehicle route. For example, the route generator 130 refers to the determination result of the road determiner 131, and searches for and generates a route including a sidewalk route, a route including a vehicle route, a route including a vehicle route and a sidewalk route, a route that does not include a vehicle route, and a route that does not include a sidewalk. The route generator 130 can execute, for example, a process (another example of a "first process") of generating a route including a pedestrian route, a route including a light vehicle route, or a route including a pedestrian route and a light vehicle route and a process (an example of a "second process") of generating a route that does not include a pedestrian route, a route that does not include a light vehicle route, or a route that does not include a pedestrian route and a light vehicle route.

The mode setter 132 determines one of a plurality of travel modes as the travel mode of the mobile object M. The travel mode includes, for example, a pedestrian mode, a light vehicle mode, and a vehicle mode. The travel mode may include other modes in addition to the above-mentioned modes, or some of the above-mentioned travel modes may be omitted. A sidewalk mode is an example of a "first operation mode".

The pedestrian mode is a mode in which the mobile object M travels based on the behavior of pedestrians around the mobile object M. The pedestrian mode is a mode in which the mobile object M travels at the walking speed of surrounding pedestrians, and the mobile object M follows the pedestrian. In the pedestrian mode, when there is no pedestrian in the vicinity, the mobile object M travels at a speed of about a preset walking speed. The mode setter 132 sets the travel mode to the pedestrian mode when the mobile object M travels along the pedestrian route.

The light vehicle mode is a mode in which the vehicle travels based on the behavior of the light vehicle around the mobile object M. The light vehicle mode is a mode in which the mobile object M travels at a speed at which a surrounding light vehicle travels, or the mobile object M follows the light vehicle. In the light vehicle mode, when there is no light vehicle in the vicinity, the mobile object M travels at a speed as high as a preset speed at which the light vehicle travels. The mode setter 132 sets the travel mode to the light vehicle mode when the mobile object M travels along the light vehicle route.

The vehicle mode is a mode in which the vehicle travels based on the behavior of the vehicle around the mobile object M. The vehicle mode is a mode in which the mobile object M travels at a speed at which a surrounding vehicle travels, or the mobile object M follows the vehicle. When there is no vehicle in the vicinity, the vehicle mode causes the mobile object M to travel at a speed as high as the speed at which the preset vehicle travels. For example, in the order of the pedestrian mode, the light vehicle mode, and the vehicle mode, the speed at which the mobile object M travels is high, and the degree of change in acceleration or deceleration is large. The mode setter 132 sets the travel mode to the vehicle mode when the mobile object M travels along the vehicle route.

The trajectory generator 140 determines one or both of a stop position where the mobile object M stops and a traveling position where the mobile object M travels based on the user's instruction, the area where the mobile object M can travel, and the area where the mobile object M cannot travel. The trajectory generator 140 generates, for example, a trajectory for traveling in the travel mode set by the mode setter 132. For example, when the pedestrian mode is set, the trajectory generator 140 generates a trajectory for allowing the mobile object M to travel at a speed of about the walking speed of surrounding pedestrians.

The trajectory generator 140 generates a target trajectory along which the mobile object M travels in the future automatically (regardless of an operation of a driver) so that it is possible to cope with a surrounding situation of the mobile object M. The target trajectory includes a speed element, for example. For example, the target trajectory is represented as an arrangement of positions (trajectory points) that the mobile object M has to reach. The trajectory points are positions that the mobile object M has to reach every predetermined travel distance (for example, approximately every several [m]) as the distance along a road. In addition to this, a target speed and a target acceleration every predetermined sampling period (for example, approximately every 0.x [sec]) are generated as part of the target trajectory. The trajectory points may be the positions that the mobile object M has to reach at respective sampling time points of the predetermined sampling periods. In this case, the information of the target speed and the target acceleration is represented by the intervals of the trajectory points.

The trajectory generator 140 generates a trajectory along which the mobile object M moves, and calculates the risk of the generated trajectory. The risk is an index value indicating the height of possibility that the mobile object M approaches an obstacle. The risk tends to become higher as the distance from the obstacle to the trajectory (trajectory point of the trajectory) decreases, and become lower as the distance from the obstacle to the trajectory (trajectory point) increases.

In the trajectory generator 140, when a total value of the risks and the risk of each trajectory point satisfy predetermined criteria (for example, when the total value is a threshold Th1 or less and the risk of each trajectory point is a threshold Th2 or less), a trajectory that satisfies the criteria is adopted as the trajectory along which the mobile object moves.

The travel controller 150 travels the mobile object M along a trajectory that satisfies predetermined criteria. The travel controller 150 outputs a command value for the mobile object M to travel along the trajectory to the travel drive force output device 200.

The information processor 160 controls various apparatuses and devices included in the mobile object M. The information processor 160 controls, for example, the HMI 30. The information processor 160 acquires voice data input to the microphone and recognizes an operation performed on the operating device. The information processor 160 provides the user with a voice or an image including information indicating the route generated by the route generator 130 using the HMI 30. Further, the information processor 160 communicates with a terminal device (not shown) held by the user using the communication device 20, and provides information indicating a route to the terminal device held by the user, or sends a predetermined notification to the terminal device. For example, the information processor 160 outputs information in which the portion determined to be the first road by the road determiner 131 is distinguished from the other portions in the first route determined by the first process described above to a display, a speaker, or the like (output device). The information processor 160 outputs notification information that the moving speed in the portion determined to be the first road is slowed down to a display, a speaker, or the like. The information processor 160 outputs information indicating that the moving speed is slowed down to the display, the speaker, or the like when the mobile object M enters the road determined to be the first road.

The travel drive force output device 200 outputs a travel drive force (torque) for the mobile object M to travel to the drive wheels. The travel drive force output device 200 includes, for example, an electric motor, and an electronic control unit (ECU) that controls these components. The ECU controls the above-mentioned components according to the information input from the travel controller 150 or the information input from the driving operator 80.

The brake device 210 includes, for example, a brake caliper, a cylinder that delivers hydraulic pressure to the brake caliper, an electric motor that generates hydraulic pressure in the cylinder, and a brake ECU. The brake ECU controls the electric motor according to the information input from the travel controller 150 or the information input from the driving operator 80 so that brake torque corresponding to a braking operation is output to each wheel.

The steering device 220 includes, for example, a steering ECU and an electric motor. The electric motor, for example, applies a force to a rack-and-pinion mechanism to change the direction of a steering wheel. The steering ECU drives an electric motor according to the information input from the travel controller 150 or the information input from the driving operator 80 to change the direction of the steering wheel.

[Overview of Control of Mobile Object]

Figure 3:
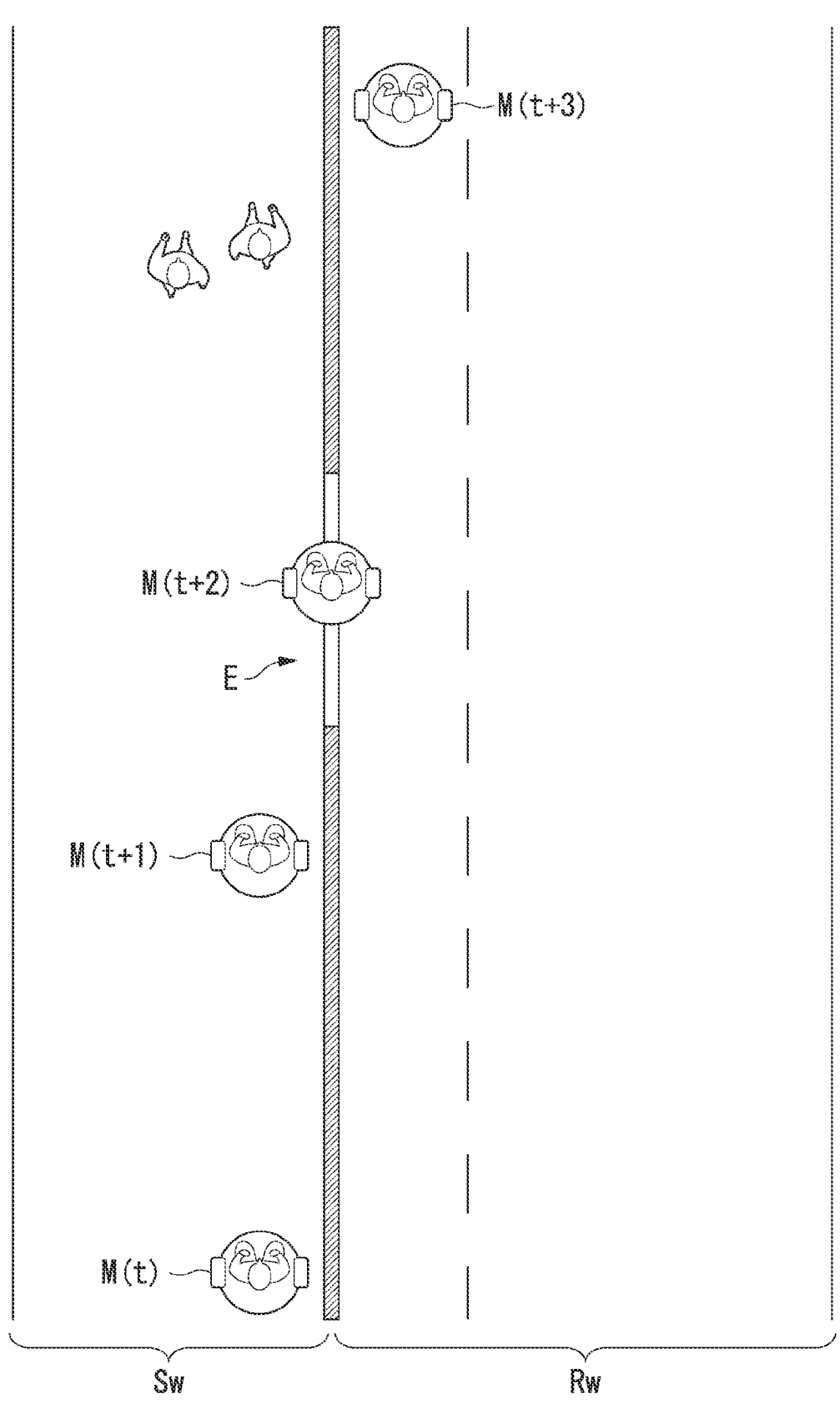
FIG. 3 is a diagram showing an example of the behavior of a mobile object.

FIG. 3 is a diagram showing an example of the behavior of the mobile object M. The mobile object M, for example, carries a user and heads for a destination (waypoint). At this time, the mobile object M travels on the sidewalk Sw (pedestrian route) (time t, t+1), or descends from the sidewalk Sw to the roadway Rw (vehicle route) and travels on the roadway Rw (time t+2, time t+3). The mobile object M, for example, walks on the sidewalk Sw at a speed as high as the walking speed of a pedestrian (for example, 4 km/h or 6 km/h), and, for example, travels on the roadway Rw at a speed higher than the above-mentioned walking speed. In the figure, "E" is the entrance of the roadway (the area where it is possible to enter the sidewalk from the roadway (or enter the roadway from the sidewalk)).

[Route Search]

The route generator 130 searches for a route to a destination including one or more of a pedestrian route, a vehicle route, and a light vehicle route. The route generator 130 generates, for example, a route including a pedestrian route and a vehicle route, and generates a route that does not include a pedestrian route or a route that does not include a vehicle route. The route generator 130 may generate a route including a light vehicle route.

The information processor 160 causes the display to display the generated route. When the user selects a desired route from the routes displayed on the display, the mobile object M heads for the destination (or waypoint) based on the selected route. Hereinafter, the route generated by the route generator 130 and displayed on the display will be illustrated.

Specific Example 1 of Searched Route

FIG. 4 is a diagram (1) showing an example of an image IM1 displayed on the display. An image IM1 includes a route A, a route B, and a route C. The route A is a time-emphasis route that includes a pedestrian route and a vehicle route, and includes more vehicle routes than pedestrian routes. The route B is a balanced route that includes a pedestrian route and a vehicle route, and includes more pedestrian routes than vehicle routes. The route C is a comfort route that does not include a vehicle route but includes a pedestrian route. For example, the arrival time is earlier in the order of the route A, the route B, and the route C. The route A (time-emphasis route) includes many vehicle routes, and the time to arrive at the destination is emphasized. The route B (balanced route) includes more pedestrian routes than the route A, and the balance between the arrival time and the ride quality of the user of the mobile object M is emphasized. The route C (comfort route) is a route for traveling along a pedestrian route, and the ride quality of the user of the mobile object M is more emphasized than the arrival time.

The image IM1 includes information indicating that the mobile object M travels in the walking mode in the pedestrian route, and that the mobile object M travels in the vehicle mode in the vehicle route. When the mobile object M travels along a pedestrian route, the information processor 160 outputs information indicating that the mobile object M travels in a walking mode based on a walking aspect of the pedestrian or information indicating that the speed of the mobile object M is slower than the speed of the mobile object M when traveling along a route (for example, a vehicle route or a light vehicle route) different from the pedestrian route to the display and the speaker (output device). When the mobile object M travels along a vehicle route, the information processor 160 outputs information indicating that the mobile object M travels in the vehicle mode or information indicating that the speed of the mobile object M is faster than the speed of the mobile object M when traveling along a route (for example, a pedestrian route or a light vehicle route) different from the vehicle route to the display and the speaker (output device).

As described above, the control device 100 generates routes having different characteristics and provides the generated routes to the user. Further, the control device 100 causes the display to display routes having different characteristics so that they can be distinguished from each other, and causes the display to display a traveling aspect of the mobile object M when the mobile object M travels along the route along which the mobile object M travels. As a result, the user can select a suitable route and allow the mobile object M to travel along the selected route to head for the destination.

Specific Example 2 of Searched Route

FIG. 5 is a diagram (2) showing an example of an image IM2 displayed on the display. The image IM2 includes a route D, a route E, and a route F. The route D includes only the vehicle route and is a time-emphasis route. The route E includes a pedestrian route and a vehicle route, and is a balanced route. The route F is a comfort route including a light vehicle route in addition to the pedestrian route. For example, the arrival time is earlier in the order of the route D, the route E, and the route F.

As described above, the control device 100 generates routes having different characteristics and provides the generated routes to the user. As a result, the user can select a suitable route and allow the mobile object M to travel along the selected route to head for the destination.

Specific Example (1) of Pedestrian Route

Figure 6:
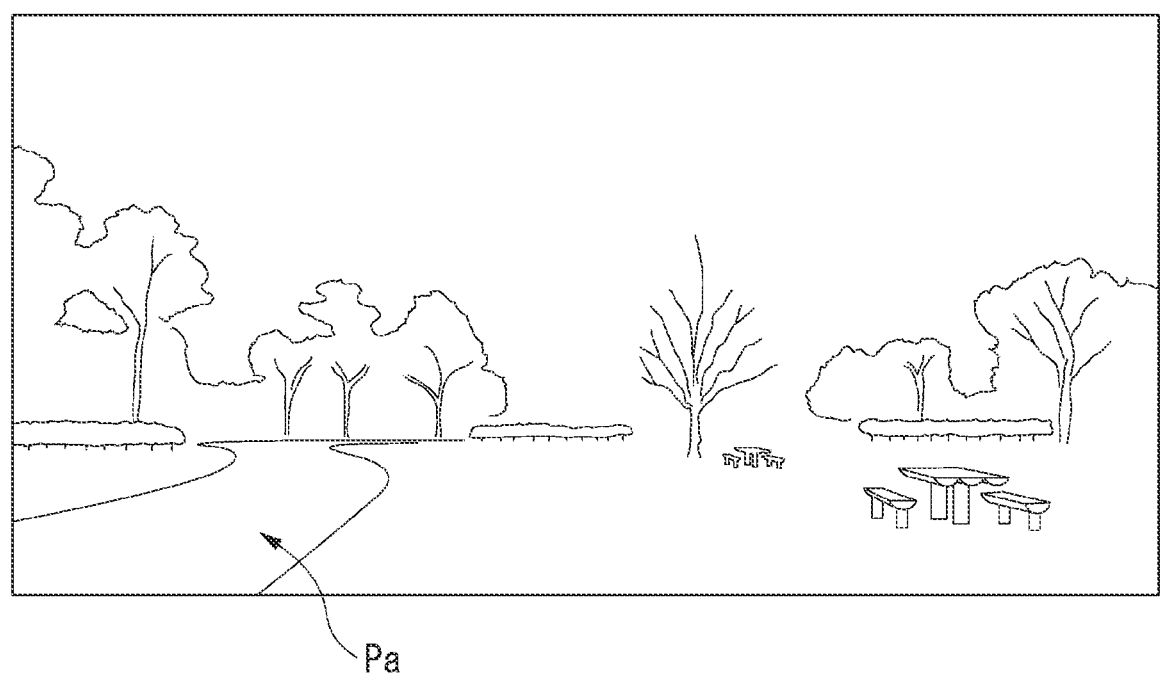
FIG. 6 is a diagram showing an example of a route in a facility where a group of vehicles cannot enter.

Here, the "pedestrian route" will be described. The pedestrian route includes, for example, a route in a facility where a group of vehicles cannot enter, as shown in FIG. 6, in addition to sidewalks. For example, the pedestrian route is a route in which passage of a group of vehicles or passage of light vehicles (while riding on light vehicles) is restricted, such as a route in a park (Pa in the figure) shown in FIG. 6, a route in a school, a route in the station, a route in a shopping center, a route for traveling in the pedestrian paradise, and the like.

Specific Example (2) of Pedestrian Route

Figure 7:
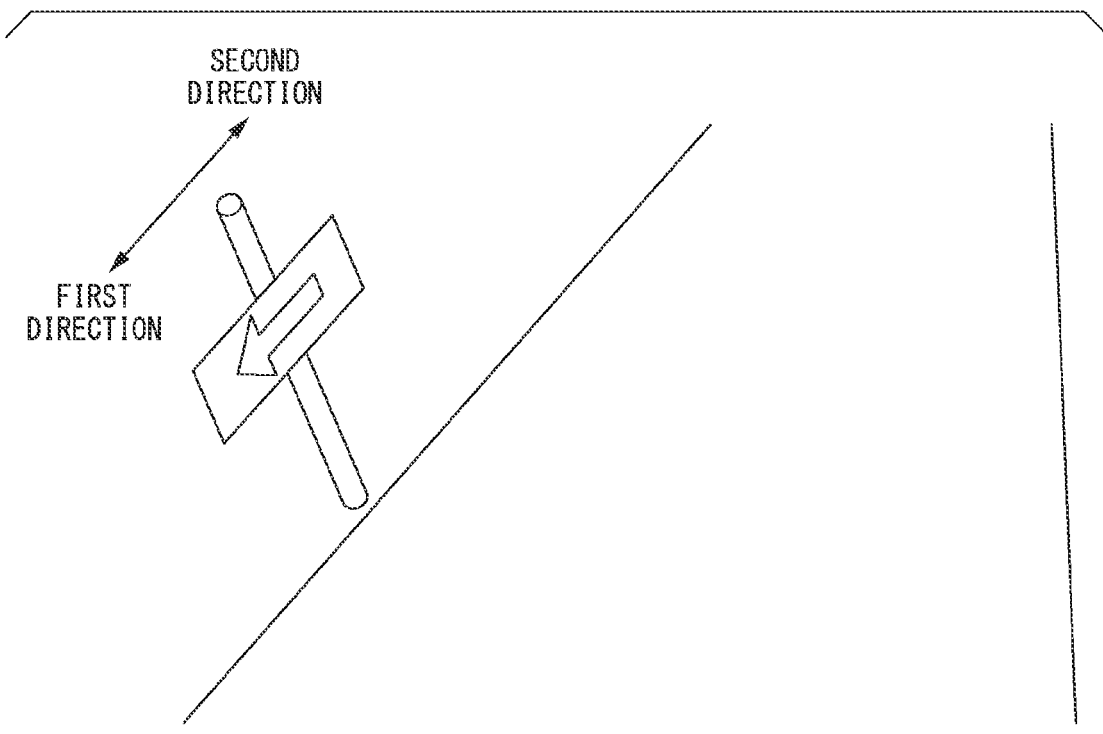
FIG. 7 is a diagram showing an example of a route on which a group of vehicles cannot travel.

The pedestrian route includes, for example, a route in which a group of vehicles cannot travel as shown in FIG. 7, in addition to sidewalks. For example, as shown in FIG. 7, the pedestrian route includes a route for traveling in a second direction in a road in which traveling of a group of vehicles in a first direction is permitted and traveling in a second direction opposite to the first direction is restricted. In FIG. 7, an example of traveling in a second direction on a road provided with a one-way restricted sign has been described. However, in addition to (or instead of) this, the pedestrian route includes a route in which vehicles or light vehicles cannot travel due to other signs and road regulations but pedestrians can travel. For example, when the walking mode is set (in the first process), the route generator 130 can generate a route for traveling in the second direction on the road shown in FIG. 7. The road shown in FIG. 7 is an example of "a predetermined road determined to be the first road when the predetermined road is a direction-regulated road in which a traffic regulation allows a predetermined type of vehicle (for example, automobiles, motorcycles, and bicycles) to travel in a first direction and restricts the predetermined type of vehicle from traveling in a second direction opposite to the first direction".

Specific Example of Light Vehicle Route

Figure 8:
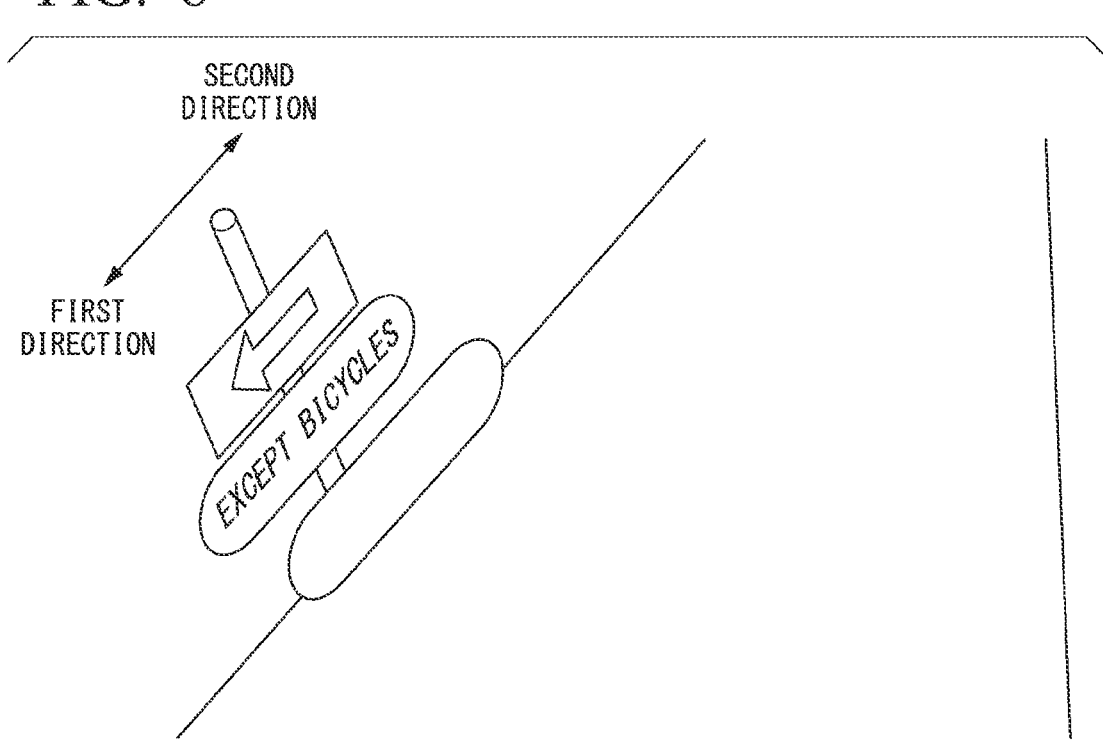
FIG. 8 is a diagram showing an example of a route on which a light vehicle cannot travel.

The light vehicle route includes, for example, a route along which the vehicle cannot travel as shown in FIG. 8. For example, as shown in FIG. 8, the light vehicle route includes a route for traveling in a second direction on a road in which traveling of vehicles in a second direction is restricted but traveling of light vehicles in a second direction is permitted. In FIG. 8, the light vehicle route includes, in addition to (or instead of) the above-described example, a route along which vehicles cannot travel due to other signs and road regulations, but light vehicles can travel. A route dedicated to light vehicles along which pedestrians cannot travel may be regarded as a light vehicle route. For example, when the walking mode is set (in the first process), the route generator 130 can generate a route for traveling in the second direction on the road shown in FIG. 8. The road shown in FIG. 8 is an example of "a predetermined road determined to be the first road when the predetermined road is a direction-regulated road in which a traffic regulation allows a predetermined type of vehicle (for example, automobiles and motorcycles) to travel in a first direction and restricts the predetermined type of vehicle from traveling in a second direction opposite to the first direction".

Specific Example 3 of Searched Route

Figure 9:
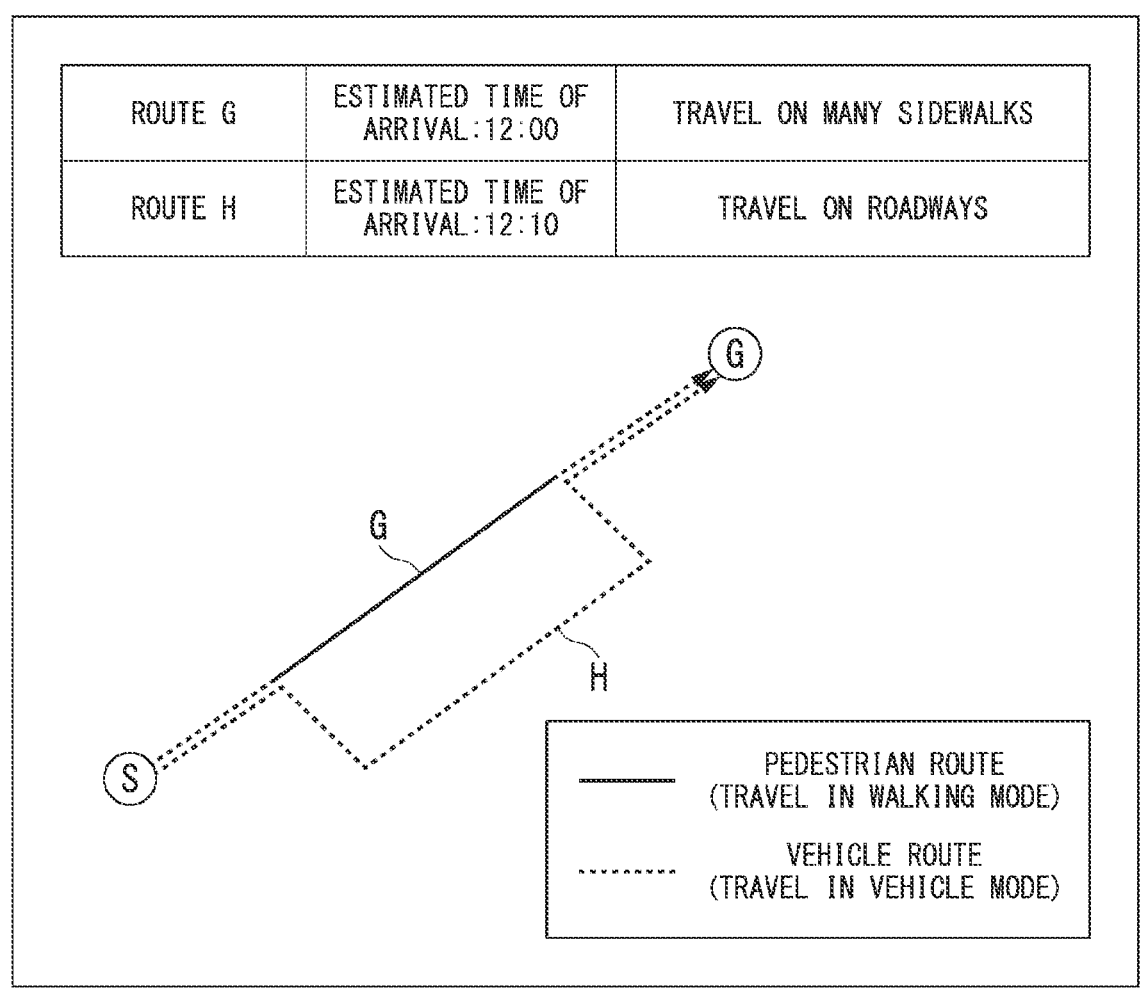
FIG. 9 is a diagram (3) showing an example of an image displayed on the display.

FIG. 9 is a diagram (3) showing an example of an image IM3 displayed on the display. The image IM3 includes a route G and a route H. The route G includes pedestrian roads and vehicle routes. The route H includes only vehicle roads. Since the mobile object M can travel on the pedestrian road (and the light vehicle road) as shown in FIGS. 6 to 8 described above, the traveling speed is slower than that on the vehicle road, but the mobile object M may be able to arrive at the destination earlier.

As described above, the control device 100 can derive a route that is comfortable for the user and can reach the destination more quickly.

[Behavior of Mobile Object]

Figure 10:
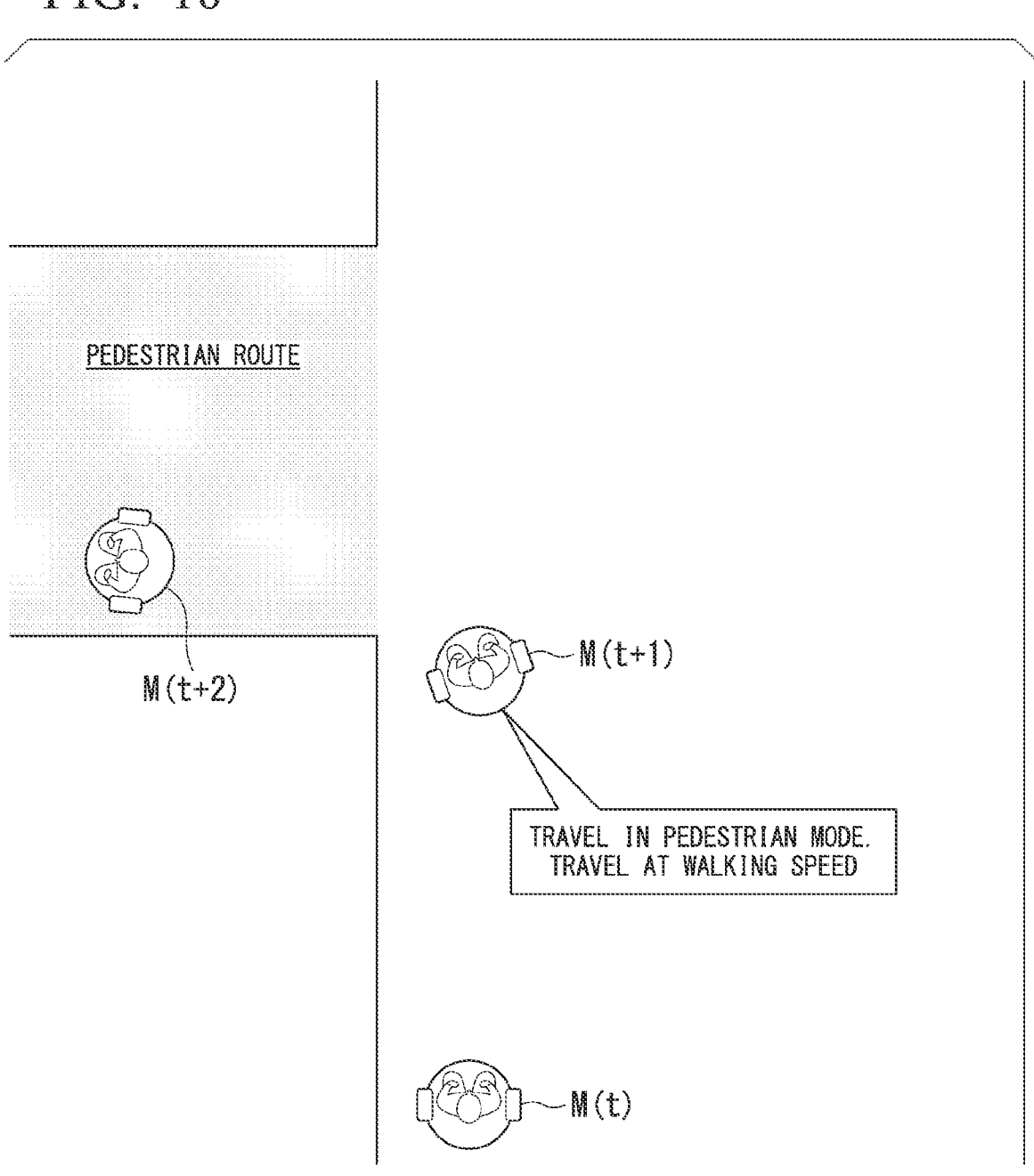
FIG. 10 is a diagram showing an example of the behavior of a mobile object.

FIG. 10 is a diagram showing an example of the behavior of the mobile object M. The control device 100 causes the mobile object M to travel based on the route selected by the user among the routes searched by the route generator 130. At time t, the mobile object M is traveling along the vehicle route. At this time, the mobile object M is traveling in the vehicle mode. At time t+1, when the mobile object M enters the pedestrian route from the vehicle route, the information processor 160 (notification device) of the mobile object M notifies the user of information indicating that the travel mode is changed from the vehicle mode to the pedestrian mode, and that the traveling speed decreases via the HMI 30 (or the terminal device of the user). After the notification, the mobile object M enters the pedestrian road from the vehicle route and travels on the pedestrian road.

As described above, when the mobile object M enters the pedestrian road, the user can recognize that the user enters the pedestrian road and the travel mode is changed, so that the convenient and the feeling of security and conviction of the user are improved.

In the above-described example, the example in which the mobile object M enters the pedestrian road has been described. However, instead of this (or in addition to this), the mobile object M enters the vehicle route from the pedestrian road or the light vehicle road, the mobile object M may notify the user that the mode is changed to the vehicle mode or the traveling speed increases. When the mobile object M enters the pedestrian road from the light vehicle road, the mobile object M may notify the user that the mode is changed to the light vehicle mode or the traveling speed increases. When the mobile object M enters the light vehicle road from the pedestrian road, the mobile object M may notify the user that the mode is changed to the pedestrian mode or the traveling speed decreases.

[Flowchart]

Figure 11:
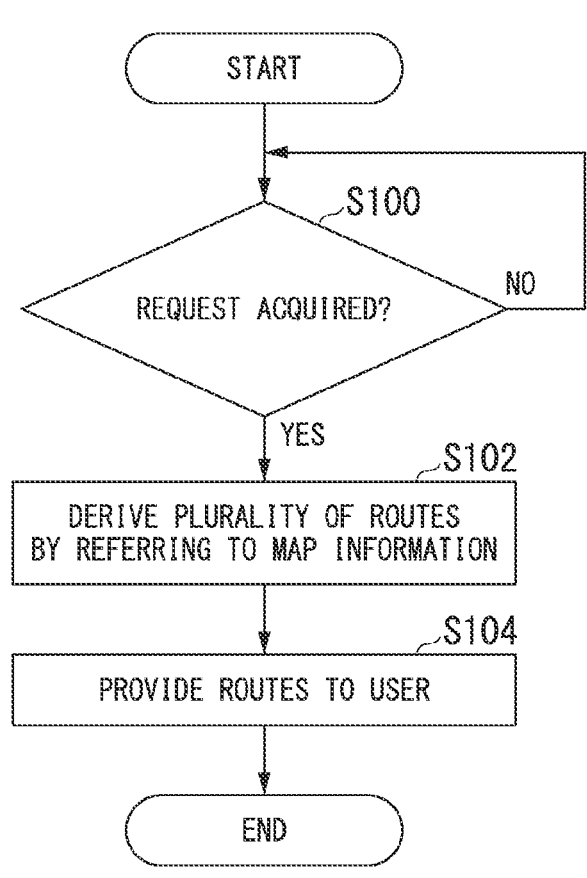
FIG. 11 is a flowchart showing an example of the flow of processing executed by a control device.

FIG. 11 is a flowchart showing an example of the flow of processing executed by the control device 100. First, the control device 100 determines whether a request for route search has been acquired from the user's operation or the terminal device operated by the user (step S100). When the request for route search is acquired, the control device 100 refers to the map information and derives a plurality of routes (step S102). For example, the control device 100 derives a plurality of routes (for example, a route toward a destination along a sidewalk route and a route including a sidewalk route) using the Dijkstra method or the like. Then, the control device 100 provides the user with the derived routes (step S104). At this time, the control device 100 provides the user with, for example, a time-emphasis route, a balanced route, and a comfort route. For example, the control device 100 provides the user with routes having different characteristics such as a vehicle route, a route including a vehicle route and a sidewalk route, and a route including a sidewalk route and a light vehicle route. In this way, the processing of one routine of this flowchart ends.

In the above-described process, when the request includes information indicating the conditions specified by the user or the intention of the user, the control device 100 derives routes satisfying the specified conditions or routes corresponding to the intention, and provides the derived routes to the user. The conditions include the desired time to arrive at the destination, the characteristics of the route, the designation of the traveling route, and the like. The characteristics of the route are, for example, the characteristics of routes having different emphasizing items such as a time-emphasis route, a balanced route, or a comfort route. The designation of a route means, for example, designation of a traveling route such as traveling along a route including a vehicle route, traveling only along a vehicle route, traveling only along a sidewalk route, traveling along a light vehicle route, or traveling along a predetermined route among these routes. The intention is, for example, to indicate that the user has permitted the mobile object M to operate in a predetermined mode such as a walking mode, or to determine that the user moves using a predetermined mode such as a walking mode. The route generator 130 generates a route corresponding to the determination based on the acquirer 110 acquiring the information indicating the above-described determination. For example, the route generator 130 performs the first process to generate a route based on the acquirer 110 acquiring the above-described determination. The route generator 130 may perform the first process based on the acquirer 110 acquiring the determination to execute the first process from the user. For example, the user operates the HMI 30 or the terminal device used by the user, and inputs voice or the like to make various determinations.

According to the first embodiment described above, the control device 100 can generate a more suitable route.

Second Embodiment

Hereinafter, a second embodiment will be described. In the first embodiment, the event included in the route allowed by the user is not considered, but in the second embodiment, the above-described event is considered. In the second embodiment, the route is generated in consideration of the user's intention. Hereinafter, the differences from the first embodiment will be mainly described.

For example, the route generator 130 performs the first process of generating the route of the mobile object M including a road determined to be the above-mentioned first road based on the acquirer 110 acquiring the user's determination to permit the operation in the walking mode (first mode) and performs the first process based on the acquirer 110 acquiring the determination to move using the walking mode from the user.

For example, the route generator 130 determines the travel mode based on the instruction of the user who uses the mobile object M (for example, the user who is on board or the user who is scheduled to board). The travel mode includes, for example, a time-emphasis mode, a comfort mode, and a balanced mode. The travel mode may include other modes in addition to the above-described modes.

The "time-emphasis mode" is a mode in which a route is generated so that the mobile object M arrives at the destination at an earlier time, and the mobile object M travels along the generated route. The "comfort mode" is a mode in which a route is generated so that the mobile object M arrives at the destination more comfortably, and the mobile object M travels along the generated route. The "balanced mode" is a travel mode in which the mobile object M arrives at the destination at an early time and the mobile object M arrives at the destination comfortably. The control device 100 generates a route according to the set travel mode, and causes the mobile object M to travel along the route.

The plurality of travel modes are defined as having different degrees of acceptance (acceptance levels) for the event. The route generator 130 generates a route based on the acceptance level corresponding to the travel mode. The route generator 130 generates a route so as to avoid an event having a low acceptance level in the travel mode.

FIG. 12 is a diagram showing an example of mode information 192 in which a travel mode and an acceptance level for each of a plurality of events are associated with each other. The mode information 192 is stored in the storage 180. The event includes traveling on steps, traveling on the boundary between the sidewalk and the roadway, traveling on hill roads, traveling on curved roads, traveling in congested areas, traveling on slopes, and passing through areas (a route that passes many signals) where mobile objects follow signals. Congestion is either sidewalk congestion or roadway congestion. For example, congestion is congestion based on the number and density of people, and congestion based on the number and density of cars and other vehicles.

Figure 13:
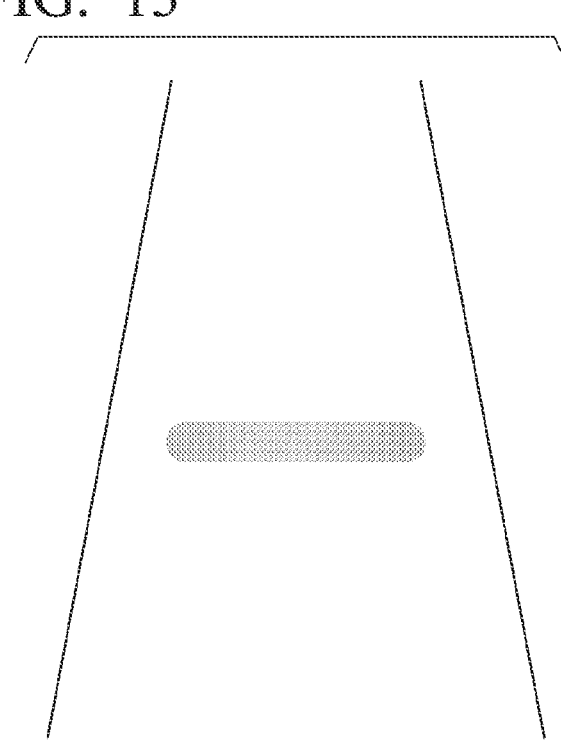
FIG. 13 is a diagram showing steps existing on a road.

The step is, for example, a step at the boundary between the roadway and the sidewalk, a step existing on the road as shown in FIG. 13 (for example, a deceleration zone), and the like. Traveling on the boundary between the sidewalk and the roadway means, for example, that the mobile object M enters the roadway from the sidewalk, or the mobile object M enters the roadway from the roadway.

Hereinafter, the acceptance level of the event for each travel mode will be described with reference to FIG. 12 described above. The acceptance level is higher in the order of "O", "Δ", and "X". A high acceptance level means that the degree of acceptance level for traveling on the route where the event occurs is higher than that of other travel modes, or that the event is accepted to occur.

The acceptance level for traveling on steps is "O" in time-emphasis mode, "Δ" in balanced mode, and "X" in comfort mode.

The acceptance level for traveling on the boundary between the sidewalk and the roadway is "O" in time-emphasis mode, "Δ" in balanced mode, and "X" in comfort mode.

The acceptance level for traveling on hill roads is "O" in time-emphasis mode, "Δ" in balanced mode, and "X" in comfort mode.

The acceptance level for traveling on curved roads is "O" in time-emphasis mode, "Δ" in balanced mode, and "X" in comfort mode.

The acceptance level for traveling in congested areas is "X" in time-emphasis mode, "Δ" in balanced mode, and "O" in comfort mode. This acceptance level may be divided into an acceptance level for traveling on a congested sidewalk and an acceptance level for traveling on a congested roadway.

The acceptance level for traveling on slopes is "O" in time-emphasis mode, "Δ" in balanced mode, and "X" in comfort mode.

The acceptance level for traveling in areas where vehicles travel according to signals is "X" in time-emphasis mode, "Δ" in balanced mode, and "O" in comfort mode.

The time-emphasis mode better allows a route for traveling on steps, a route that switches between sidewalks and roadways, a route for traveling on hill roads, a route for traveling on curved roads, or a route for traveling on slopes than other travel modes. The time-emphasis mode less allows a route for traveling in a congested area (a route in which congestion is predicted to occur in the future), or a route for traveling in an area in which vehicles follow signals than other travel modes. When the time-emphasis mode is set, the occurrence of vertical shaking, lateral shaking, and vertical or lateral acceleration felt by the user riding on the mobile object M is less emphasized than in other modes, and arriving earlier at the destination is emphasized.

The comfort mode less allows a route for traveling on steps, a route for switching between sidewalks and roadways, a route for traveling on hill roads, a route for traveling on curved roads, or a route for traveling on slopes than other modes. The comfort mode more allows a route for traveling in a congested area (a route in which congestion is predicted to occur in the future), or a route for traveling in an area in which vehicles follow signals than other travel modes. When the comfort mode is set, the suppression of the occurrence of vertical shaking, lateral shaking, and vertical or lateral acceleration felt by the user riding on the mobile object M is emphasized and arriving earlier at the destination is less emphasized than in other modes.

When the balanced mode is set, it is a mode in which the balance between the comfort mode and the time-emphasis mode is taken into consideration, and both the suppression of the occurrence of vertical shaking, lateral shaking, vertical or lateral acceleration felt by the user riding on the mobile object M and arriving earlier at the destination are taken into consideration.

[Flowchart (1)]

Figure 14:
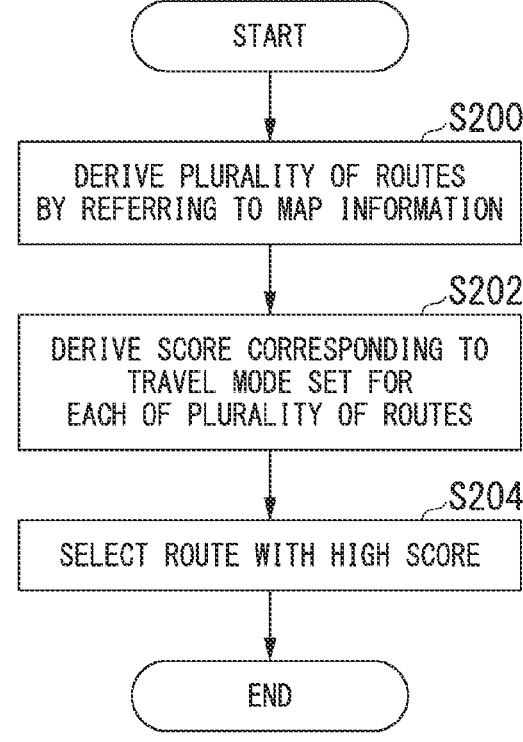
FIG. 14 is a flowchart showing an example of the flow of processing executed by a control device.

FIG. 14 is a flowchart showing an example of the flow of processing executed by the control device 100. First, the route generator 130 of the control device 100 refers to the map information 190 and derives a plurality of routes to the destination (step S200). A plurality of routes are routes in which the time and distance to reach the destination are within reasonable ranges. The plurality of routes includes sidewalk routes, roadway routes, light vehicle routes, or routes that combine these routes.

Next, the control device 100 derives a score corresponding to the set travel mode for each of the plurality of routes (step S202). Next, the control device 100 selects a route having a high score (step S204). In this way, the processing of one routine of this flowchart ends.

In this process, when a plurality of reasonable routes are generated, a route for traveling only on the roadway or a route for traveling only on the sidewalk is derived (when a trajectory that passes through the boundary between the roadway and the sidewalk is not generated)), the process of step S102 for generating the trajectory along which the mobile object M travels based on the acceptance level corresponding to the travel mode may not be performed. In other words, when the control device 100 generates a trajectory that passes through the boundary between the sidewalk and the roadway, the control device 100 may generate a trajectory along which the mobile object M travels at least on the sidewalk based on the acceptance level corresponding to the determined travel mode. On the other hand, when the control device 100 does not generate a trajectory that passes through the boundary between the sidewalk and the roadway, the control device 100 may not generate a trajectory along which the mobile object M travels at least one the sidewalk based on the acceptance level corresponding to the determined travel mode. As described above, when the range of choice of route type is narrow or limited, the processing load is reduced.

FIG. 15 is a diagram showing an example of the score for each of a plurality of routes. For example, it is assumed that the travel mode is set to the comfort mode. In FIG. 15, a score is given to each item, and the higher the score, the more likely it is to avoid the event of that item. As shown in FIG. 15, a high weight is given to an event having a low acceptance level in the travel mode, and a score is derived. For example, the weight for a small number of steps and a small number of switchings between the sidewalk and the roadway is given a higher weight than the degree of congestion. As described above, the score for each route is derived by taking the weight for each event into consideration. Then, the control device 100 selects a route having a high score. In FIG. 15, the route 3 is a route (route) having few steps and few switching between the roadway and the sidewalk, and is a route suitable for the comfort mode.

For example, in the map information 190, links, nodes, and coordinates are associated with various pieces of information such as the presence of a step, whether the road is a sidewalk or a roadway, the gradient or curvature of a roadway or sidewalk, and the type of roadway or sidewalk (whether it is a slope), and signal information. The control device 100 acquires congestion information from another device such as a server device that provides the congestion information. The control device 100 refers to various pieces of information and congestion information included in the map information 190 to derive the scores for each route.

As described above, the route generator 130 of the control device 100 can generate a route suitable for the travel mode. The control device 100 allows the mobile object M to travel along the generated route (the route generated based on the set travel mode). In this case, when traveling on a vehicle road, the mobile object travels in the vehicle mode, when traveling on the light vehicle road, the mobile object travels in the light vehicle mode, and when traveling on the pedestrian road, the mobile object travels in the pedestrian mode. The control device 100 can allow the mobile object M to travel along a route suitable for the user.

FIG. 16 is a diagram showing an example of an image IM4 including the routes generated by the control device 100. The image IM3 includes a route I, a route J, and a route K. The route I is a time-emphasis mode route for traveling on roadways and sidewalks, and traveling on portions with steps. The route J is a balanced mode route for traveling on sidewalks more than the route I. The route K is a comfort mode route for traveling on sidewalks.

As described above, the control device 100 can improve the convenience of the user by generating routes corresponding to each mode and providing the user with information indicating the generated routes and the characteristics of the routes.

According to the second embodiment described above, the control device 100 can generate a route suitable for the user based on the acceptance level of the event corresponding to the travel mode, and allows the mobile object M to travel along the suitable route.

Third Embodiment

Hereinafter, a third embodiment will be described. In the first embodiment and the second embodiment, it has been described that the control device 100 generates a route, but in the third embodiment, a route generation device different from the control device 100 generates a route. Hereinafter, the differences of the third embodiment from those of the first and second embodiments will be mainly described.

FIG. 17 is a diagram showing an example of the functional configuration of the route search system 1 including the mobile object M of the third embodiment. The route search system 1 includes the mobile object M and a route generation device 300. The mobile object M and the route generation device 300 communicate with each other via, for example, a network NW. The network NW includes, for example, the Internet, a wide area network (WAN), a local area network (LAN), a telephone line, a public line, a dedicated line, a provider device, a radio base station, and the like.

In a control device 100A of the mobile object M, for example, the route generator 130 is omitted. The route generation device 300 has, for example, a functional configuration similar to that of the route generator 130. The route generation device 300 derives the route of the mobile object M by referring to the map information, for example.

The route search system 1 performs the following processing. (1) The control device 100A of the mobile object M transmits a request for route generation to the route generation device 300. (2) The route generation device 300 acquires the request transmitted from the control device 100A, and derives a route according to the acquired request. (3) The route generation device 300 transmits the derived route to the mobile object M. The mobile object M travels based on the route acquired from the route generation device 300.

According to the third embodiment described above, the route search system 1 can generate a more suitable route by generating the route of the mobile object M.

The embodiments described above can be expressed as follows.

A control device of a mobile object that can move in any one operation mode determined from a plurality of operation modes, the control device including: a storage device that stores a program; and a hardware processor, wherein the hardware processor executes the program stored in the storage device to execute: determining whether a predetermined road is a first road in which passage of vehicles in a mode other than a first operation mode in which a maximum moving speed of the mobile object is less than a predetermined speed is restricted; and executing a first process of generating a route of the mobile object so as to include the road determined to be first road and a second process of generating a route of the mobile object so as not to include the road determined to be the first road.

While modes for carrying out the present invention have been described using embodiments, the present invention is not limited to these embodiments, and various changes and substitutions can be made without departing from the spirit of the present invention.

What is claimed is:

1. A control system of a mobile object that can move in any one operation mode determined from a plurality of operation modes, wherein the operation modes include a first operation mode and a second operation mode, the first operation mode is a mode in which the mobile object moves at a speed less than a predetermined speed and does not move at a speed equal to or greater than the predetermined speed, the second operation mode is a mode in which the mobile object moves at a speed equal to or greater than the predetermined speed, the control system comprising:

a storage device configured to store instructions; and
one or more processors,
wherein the one or more processors execute the instructions stored in the storage device to:
determine whether a predetermined road is a first road in which passage of vehicles in an operation mode other than a first operation mode, in which a maximum moving speed of the mobile object is less than a predetermined speed, is restricted,
wherein the first road is a sidewalk on which movement of the mobile object in the first operation mode is permitted and on which movement of the mobile object in the second operation mode is restricted, the movement of a vehicle is restricted, and the movement of pedestrians is permitted;
based on the determining of the predetermined road, provide information to a user, the information comprising characteristics and designations for a group of routes, wherein the characteristics define individual ones of the group of routes as time-emphasized, comfort-emphasized, or a balance therebetween, and wherein the designations differently define the individual ones of the group of routes as corresponding to operation in the first operation mode or in the second operation mode;
perform acquisition of information on a user's determination to execute a first process based on the information provided, wherein the user's determination to execute the first process comprises a selection of a first route, from the group of routes, of a planned route for the mobile object to a single predetermined point, and wherein the selection of the first route corresponds to both a characteristic, of the characteristics, and a designation, of the designations, of the first route;
based on the acquisition of the information on the user's determination to execute the first process, execute the first process of generating the first route of the mobile object so as to include the first road and the second road on which the movement of a vehicle is permitted;
execute a second process of generating a second route of the mobile object so as to include the second road and so as not to include the first road;
generate a planned route of the mobile object to a single predetermined point, the planned route including the first route generated by the first process and the second route generated by the second process;

cause the mobile object to move in the first operation mode when the mobile object moves on the first road in the first route;

cause the mobile object to move in the second operation mode when the mobile object moves on the second road in the first route; and cause the mobile object to move in the second operation mode when the mobile object moves in the second route.

2. The control system according to claim 1, wherein the one or more processors execute the instructions to:

determine that the predetermined road is the first road when the predetermined road is a sidewalk.

3. The control system according to claim 1, wherein the one or more processors execute the instructions to:

determine that the predetermined road is the first road when the predetermined road is a direction-regulated road in which a traffic regulation allows a predetermined type of vehicle to travel in a first direction and restricts the predetermined type of vehicle from traveling in a second direction opposite to the first direction.

4. The control system according to claim 3, wherein the one or more processors execute the instructions to:

generate a route in which vehicles travel on the direction-regulated road in the second direction by the first process.

5. The control system according to claim 1, wherein the one or more processors execute the instructions to:

execute the first process based on acquisition of the information on the user's determination, which information on the user's determination further corresponds to permitting operation in the first operation mode, based on the selection of the first route as corresponding to a designation of the designations.

6. The control system according to claim 1, wherein the one or more processors execute the instructions to:

execute the first process based on acquisition of the information on the user's determination, which information on the user's determination further corresponds to permitting moving using the first operation mode, based on the selection of the first route as corresponding to a designation of the designations.

7. The control system according to claim 1, wherein the one or more processors execute the instructions to:

cause an output device to output information of a portion determined to be the first road in a first route generated by the first process so as to be distinguished from information of other portions.

8. The control system according to claim 1, wherein the one or more processors execute the instructions to:

cause an output device to output information indicating that a moving speed decreases in a portion determined to be the first road in a first route generated by the first process.

9. The control system according to claim 1, wherein the one or more processors execute the instructions to:

prior to causing the mobile object to move in the first operation mode or in the second operation mode, cause an output device to output that the moving speed of the mobile object is going to change upon entering the first road.

10. A mobile object equipped with the control system according to claim 1.

11. The control system according to claim 1, wherein the mobile object moving by the first mode is permitted passage at the sidewalk in which the passage of a vehicle is not permitted, the mobile object moving by the second mode is not permitted the passage at the sidewalk and is permitted passage at the second road.

12. The control system according to claim 1, wherein the group of routes are selected based on event information from the user corresponding to an event that limits the classifications or the designations of the routes that are provided in the group of routes to the user, and wherein an event comprises one or more of traveling on steps, traveling on a boundary between a sidewalk and a roadway, traveling on a hill road, traveling on a curved road, traveling in a congested area, traveling on a slope, or passing through an area where mobile objects follow signals.

13. A control method for controlling a mobile object that can move in any one operation mode determined from a plurality of operation modes, wherein the operation modes include a first operation mode and a second operation mode, the first operation mode is a mode in which the mobile object moves at a speed less than a predetermined speed and does not move at a speed equal to or greater than the predetermined speed, the second operation mode is a mode in which the mobile object moves at a speed equal to or greater than the predetermined speed, the method causing a computer to execute:

determining whether a predetermined road is a first road in which passage of vehicles in a mode other than a first operation mode, in which a maximum moving speed of the mobile object is less than a predetermined speed, is restricted, wherein the first road is a sidewalk on which movement of the mobile object in the first operation mode is permitted and on which movement of the mobile object in the second operation mode is restricted, the movement of a vehicle is restricted, and the movement of pedestrians is permitted;

based on the determining of the predetermined road, providing information to a user, the information comprising characteristics and designations for a group of routes, wherein the characteristics define individual ones of the group of routes as time-emphasized, comfort-emphasized, or a balance therebetween, and wherein the designations differently define the individual ones of the group of routes as corresponding to operation in the first operation mode or in the second operation mode;

performing acquisition of information on a user's determination to execute a first process based on the information provided, wherein the user's determination to execute the first process comprises a selection of a first route, from the group of routes, of a planned route for the mobile object to a single predetermined point, and wherein the selection of the first route corresponds to both a characteristic, of the characteristics, and a designation, of the designations, of the first route;

based on the acquisition of the information on the user's determination to execute the first process, executing the first process of generating a first route of the mobile object so as to include the first road and the second road on which the movement of a vehicle is permitted;

executing a second process of generating a second route of the mobile object so as to include the second road and so as not to include the first road;

generating a planned route of the mobile object to a single predetermined point, the planned route including the first route generated by the first process and the second route generated by the second process;

causing the mobile object to move in the first operation mode when the mobile object moves on the first road in the first route;

causing the mobile object to move in the second operation mode when the mobile object moves on the second road in the first route; and causing the mobile object to move in the second operation mode when the mobile object moves in the second route.

14. The control method according to claim 13, further comprising:

executing the first process based on acquisition of the information on the user's determination, which information on the user's determination further corresponds to permitting operation in the first operation mode, based on the selection of the first route as corresponding to a designation of the designations.

15. The control method according to claim 13, further comprising:

executing the first process based on acquisition of the information on the user's determination, which information on the user's determination further corresponds to permitting moving using the first operation mode, based on the selection of the first route as corresponding to a designation of the designations.

16. A control system of a mobile object that can move in any one operation mode determined from a plurality of operation modes, wherein the operation modes include a first operation mode, a second operation mode, and a third operation mode, the first operation mode is a mode in which the mobile object moves at a speed less than a predetermined speed and does not move at a speed equal to or greater than the predetermined speed, the predetermined speed being determined based on a moving speed of a pedestrian, the second operation mode and the third operation mode is a mode in which the mobile object moves at a speed equal to or greater than the predetermined speed, the second operation mode is a mode in which the mobile object moves at a speed based on a speed that a vehicle around the mobile object travels, the third operation mode is a mode in which the mobile object moves at a speed based on a speed that a non-motorized vehicle around the mobile object travels, the control system comprising:

a storage device configured to store instructions; and one or more processors, wherein the one or more processors execute the instructions stored in the storage device to:

determine whether a predetermined road is a first road in which passage of vehicles in an operation mode other than a first operation mode, in which a maximum moving speed of the mobile object is less than a predetermined speed, is restricted, wherein the first road is a sidewalk on which movement of the mobile object in the first operation mode is permitted and on which movement of the mobile object in the second operation mode is restricted, the movement of a vehicle is restricted, and the movement of pedestrians is permitted, based on the determining of the predetermined road, provide information to a user, the information comprising characteristics and designations for a group of routes, wherein the characteristics define individual ones of the group of routes as time-emphasized, comfort-emphasized, or a balance therebetween, and wherein the designations differently define the individual ones of the group of routes as corresponding to operation in the first operation mode or in the second operation mode;

perform acquisition of information on a user's determination to execute a first process based on the information provided, wherein the user's determination to execute the first process comprises a selection of a first route, from the group of routes, of a planned route for the mobile object to a single predetermined point, and wherein the selection of the first route corresponds to both a characteristic, of the characteristics, and a designation, of the designations, of the first route;

based on the acquisition of the information on the user's determination to execute the first process, execute the first process of generating a first route of the mobile object so as to include the first road and the second road in which the passage of a vehicle is permitted;

execute a second process of generating a second route of the mobile object so as to include the second road and so as not to include the first road, the second road being a road on which movement of the mobile object in the second operation mode and the third operation mode is permitted;

generate a planned route of the mobile object to a single predetermined point, the planned route including the first route generated by the first process and the second route generated by the second process;

cause the mobile object to move in the first operation mode when the mobile object moves on the first road in the first route;

cause the mobile object to move in the second operation mode when the mobile object moves on the second road in the first route;

cause the mobile object to move in the second operation mode based on a speed of a vehicle around the mobile object in a case that the mobile object is operating in the second operation mode when the mobile object moves in the second route; and cause the mobile object to move in the third operation mode based on a speed of a non-motorized vehicle around the mobile object in a case that the mobile object is operating in the third operation mode when the mobile object moves in the second route.

* * * * *